United States Patent
Dixit

(10) Patent No.: US 12,539,078 B2
(45) Date of Patent: Feb. 3, 2026

(54) SYSTEM AND METHOD FOR PERSONALIZED BIOFEEDBACK FROM A WEARABLE DEVICE

(71) Applicant: Zenso, Inc., San Francisco, CA (US)

(72) Inventor: Rohan Dixit, San francisco, CA (US)

(73) Assignee: Zenso, Inc., San Francisco, CA (US)

( * ) Notice: Subject to any disclaimer, the term of this patent is extended or adjusted under 35 U.S.C. 154(b) by 518 days.

(21) Appl. No.: 17/687,393

(22) Filed: Mar. 4, 2022

(65) Prior Publication Data

US 2022/0280105 A1    Sep. 8, 2022

Related U.S. Application Data

(60) Provisional application No. 63/156,575, filed on Mar. 4, 2021.

(51) Int. Cl.
| | |
|---|---|
| A61B 5/00 | (2006.01) |
| A61B 5/024 | (2006.01) |
| G16H 20/70 | (2018.01) |
| G16H 40/67 | (2018.01) |

(52) U.S. Cl.
CPC .......... *A61B 5/486* (2013.01); *A61B 5/02405* (2013.01); *A61B 5/02438* (2013.01); *A61B 5/7267* (2013.01); *G16H 20/70* (2018.01); *G16H 40/67* (2018.01); *A61B 5/7405* (2013.01); *A61B 5/742* (2013.01); *A61B 5/7455* (2013.01)

(58) Field of Classification Search
None
See application file for complete search history.

(56) References Cited

U.S. PATENT DOCUMENTS

| | | |
|---|---|---|
| 6,168,563 B1 | 1/2001 | Brown |
| 6,270,455 B1 | 8/2001 | Brown |
| 6,840,904 B2 | 1/2005 | Goldberg |
| 7,565,132 B2 | 7/2009 | Ayed |
| 9,699,528 B2 | 7/2017 | Dixit |
| 10,284,924 B2 | 5/2019 | Dixit |
| 10,735,831 B2 | 8/2020 | Dixit |
| 2008/0035147 A1 | 2/2008 | Kirby et al. |
| 2010/0079264 A1 | 4/2010 | Hoellwarth |
| 2010/0169111 A1 | 7/2010 | Brue et al. |
| 2011/0015468 A1 | 1/2011 | Aarts et al. |
| 2012/0203076 A1 | 8/2012 | Fatta et al. |
| 2014/0039914 A1 | 2/2014 | Dansereau et al. |
| 2014/0073486 A1* | 3/2014 | Ahmed ............. A61B 5/11 600/479 |
| 2014/0081666 A1 | 3/2014 | Teller et al. |
| 2015/0199010 A1 | 7/2015 | Coleman et al. |

(Continued)

FOREIGN PATENT DOCUMENTS

IN      201941034439 A      8/2019

*Primary Examiner* — Mallika D Fairchild
(74) *Attorney, Agent, or Firm* — Alpine Patents LLC; Brian Van Osdol

(57) ABSTRACT

A method and system for personalized biofeedback from a wearable device that can include collecting a set of biometric inputs comprising at least heart activity data; generating a heart rate variability signal from the heart activity data; determining a feedback treatment plan which is based at least in part by processing of biometric inputs which comprises analyzing the heart rate variability signal; and delivering feedback based on the feedback treatment plan.

18 Claims, 12 Drawing Sheets

(56) References Cited

U.S. PATENT DOCUMENTS

| | | |
|---|---|---|
| 2015/0342518 A1* | 12/2015 | Persidsky ............ A61B 5/6831 |
| | | 600/534 |
| 2015/0370994 A1 | 12/2015 | Madan et al. |
| 2016/0234572 A1* | 8/2016 | Dixit .................. G08B 21/0423 |
| 2016/0367157 A1* | 12/2016 | Blake .................... A61B 5/053 |
| 2017/0300648 A1 | 10/2017 | Charlap |
| 2018/0096738 A1 | 4/2018 | Moturu et al. |
| 2019/0109830 A1 | 4/2019 | McFarland et al. |
| 2019/0254590 A1* | 8/2019 | Venkatraman ....... A61B 5/0205 |
| 2019/0336077 A1 | 11/2019 | Kuhn et al. |
| 2020/0389711 A1 | 12/2020 | Dixit |
| 2021/0177318 A1* | 6/2021 | Lintereur ............... G16H 40/63 |
| 2022/0256255 A1 | 8/2022 | Dixit |

\* cited by examiner

Collecting a set of biometric inputs S110

Determining a feedback treatment plan based on processing of the biometric inputs S120

Delivering feedback based on the feedback treatment plan S130

FIGURE 1

Collecting a set of biometric inputs S110

Determining a feedback treatment plan based on processing of the biometric inputs S120

Delivering biofeedback based on the feedback treatment plan S132

FIGURE 2

Collecting a set of biometric inputs S110

Determining a feedback treatment plan based on processing of the biometric inputs S120

Delivering behavioral intervention feedback based on the feedback treatment plan S134

FIGURE 3

SYSTEM AND METHOD FOR PERSONALIZED BIOFEEDBACK FROM A WEARABLE DEVICE

CROSS-REFERENCE TO RELATED APPLICATIONS

This Application claims the benefit of U.S. Provisional Application No. 63/156,575, filed on 4 Mar. 2021, which is incorporated in its entirety by this reference.

TECHNICAL FIELD

This invention relates generally to the field of health monitoring devices and more specifically to a new and useful system and method for personalized biofeedback from a wearable device.

BACKGROUND

There has been an increase focus on mental health and mindfulness in the health space. Increasingly, research is showing a connection between mental state and various conditions.

More technology solutions are being used to provide basic reminders for a user to take time to breathe, take a break, meditate, or perform some other task with the goal of improving mental state of the user. Many such solutions are often simplistic solutions such as repeating the same prompt for every user one time every hour. Such solutions are limited in their effectiveness.

Thus, there is a need in the health monitoring device field to create a new and useful system and method for personalized biofeedback from a wearable device This invention provides such a new and useful system and method.

BRIEF DESCRIPTION OF THE FIGURES

FIG. 1 is a flowchart representation of a method for personalized feedback.

FIG. 2 is a flowchart representation of a method for personalized biofeedback.

FIG. 3 is a flowchart representation of a method for personalized behavioral intervention feedback.

DESCRIPTION OF THE EMBODIMENTS

Figure 4:
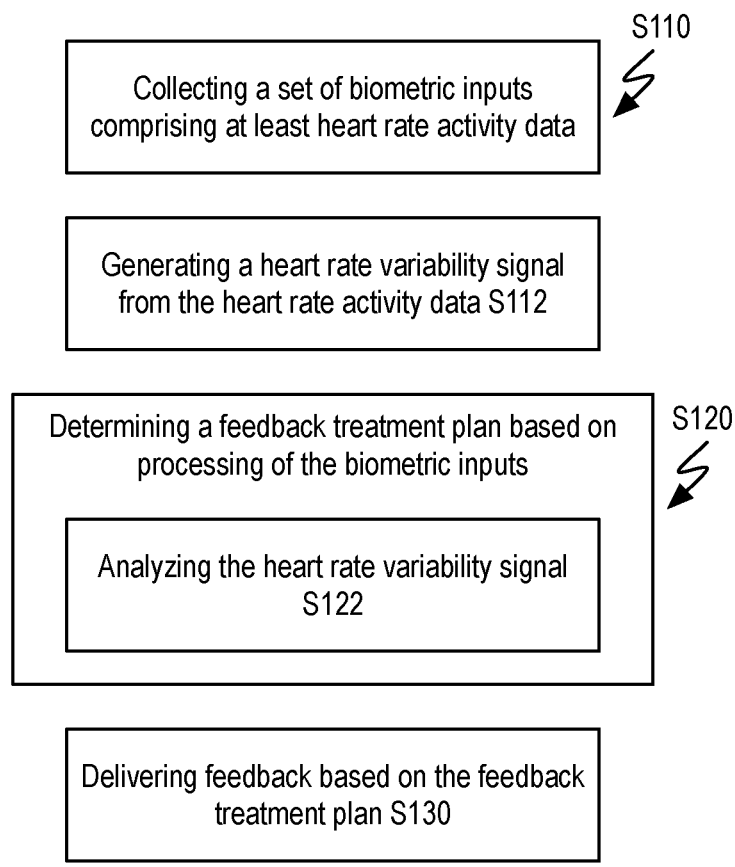
FIG. 4 is a flowchart representation of a method variation personalizing biofeedback based on heart rate variability signal.

The following description of the embodiments of the invention is not intended to limit the invention to these embodiments but rather to enable a person skilled in the art to make and use this invention.

1. Overview

A method and system for personalized biofeedback from a wearable device function to apply AI, machine learning (ML), or other forms of data analysis to modeling health and biological signals of an individual and then intelligently delivering feedback through a computing device in a personalized manner. The method and system may enable collection of biometric data of a user, and then use data modeling (e.g., using ML deep learning mode) to determine a feedback treatment plan, and then administer that plan. In one preferred variation, the feedback system is a haptic feedback system. In another variation, the feedback system may additionally or alternatively provide user feedback through other human-computer user interfaces. In some variations, the system and method may additionally be used in monitoring and administering feedback for treatments such as the prescription of a pharmaceutical.

The method and system may be applied to provide device-delivered interventions that are used to guide a use through breathing, meditation, and/or other forms of exercises. In particular, the interventions may be delivered as biofeedback wherein the feedback is reactive to the biometric signals sensed of a user. In one variation, a breathing exercise is guided where biofeedback is activated in synchronization with a heart rate variation signal (i.e., instantaneous/real-time heart rate signal) of a user, which can result in improvements (e.g., elevations) in the HRV signal.

In some variations, the method and system may additionally or alternatively function to provide dynamic health diagnosis and personalized treatment by incorporating machine learning for both diagnosis and treatment. AI/ML may be applied in providing a "diagnosis" model for characterizing and/or classifying potential patterns in biological signals of a user. AI/ML may additionally or alternatively be applied in providing a "prescription" or "treatment" model for customizing treatment as applied through biofeedback, pharmaceutical treatment, or other forms of treatment. The method and system may particularly be implemented in assisting the user to relax from a high stress health state by providing dynamic haptic feedback to assist the user in adjusting the user behavior such that the user may return to a calmer, "healthier", health state.

The system and method may be used to direct changes in user behavior along various controllable parameters. In one variation, the system and method are used in directing breathing exercises that can be used to augment mental state, respiration, and/or heart rate. The system and method can employ breathing exercises in synchronization with a biological signal like a user's heart rate variability signal such as in U.S. Pat. No. 9,699,528, filed 8 Feb. 2016. In another variation, the system and method may be used in directing dosage or prescriptions of a pharmaceutical. The timing, amount, and type of a drug, supplement, therapy, and/or other suitable form of medical treatment may be dynamically augmented in response to modeled reactions.

While the system and method may be applied to or incorporate a variety of biological signals, the system and method are preferably applied in connection with the measurement and tracking of heart rate variability (HRV). Heart rate variability is a signal reflecting the change in heart rate over time.

The method and system may be useful for any individuals wishing to better take care of themselves. The method and system may be particularly useful for any user with chronic mental or physical problems where the problem in question may be treated by user awareness and modifiable behavioral change of the user. One specific use case for chronic health problems would be for a person who regularly suffers because of high stress. The method and system may provide near immediate awareness of the problem and dynamic guidance to aid the user to a lower stress state.

Another use case of the method and system may be for a user who is receiving some type of health (physical or mental) therapy. The method and system may enable both monitoring of therapeutic and/or medicated treatment of the user and aid in improving therapeutic and/or medicated treatment of the user.

In one preferred application, the system and method are used in delivering biofeedback in the form of haptic feedback, audio feedback, visual feedback, and/or other suitable types of feedback. The biofeedback is preferably used in notifying a user of a particular biological state or event, guiding a user in breathing exercises, and/or directing a user in other suitable ways.

In another preferred application, the system and method may be used in combination with tracking and monitoring impact of a pharmaceutical usage. The biological signal response to individual instances of taking a pharmaceutical and long-term physiological changes while taking a pharmaceutical could be tracked.

The impact of a pharmaceutical may additionally or alternatively be applied to tracking and interpreting other effects of a user's life such as the impact of diet, activities (exercise, work, relaxation, sleep), and the like. The effectiveness of a pharmaceutical can be tracked using the health models. In some cases, the effectiveness, response time, side effects, and/or long-term trends (improvement or degradation of conditions) may be tracked through diagnosis through the health model. In some variations, a personalized learning model may then be applied to direct changes of a prescription or approach. Such changes in application of a pharmaceutical may be coordinated through a medical expert.

In some exemplary applications, biofeedback may be used in coordination with pharmaceutical where prescriptions can be modified or managed in concert with application of biofeedback in an effort to optimize or enhance treatment and/or health of an individual.

The system and method may provide a number of potential benefits. The system and method are not limited to always providing such benefits and are presented only as exemplary representations for how the system and method may be put to use. The list of benefits is not intended to be exhaustive and other benefits may additionally or alternatively exist.

As one potential benefit, the system and method may personalize administration of biofeedback. Personalized treatment may significantly improve the effectiveness of biofeedback treatment. In one exemplary variation, heart rate variation synchronized breathing exercises that are intelligently administered and executed in way custom to a user may result in better improvements to a user's HRV values. For example, breathing exercises, which traditionally are presented as suggested behaviors, can be rigorously prescribed, and directed through a device so as to possibly impart measurable and/or tangible changes to a user.

Another potential benefit of the method and system is implementation of a machine learning health model. The health model may provide near immediate awareness of a user health problems. Different classes of mental disorders may be automatically classified and then used to apply appropriate forms of feedback.

Another potential benefit provided by the health model may be awareness and diagnosis of an unknown user health problem. Many current systems rely on subjective self-reporting of moods and feelings by a user when monitoring mental state. The system and method operate around biometric driven monitoring that is easier for users and can more consistently interpret results to identify issues. As the system and method can be more passively used by a user, it can be more widely adopted by users thereby helping more people that may have previously had suffered from existing or emerging mental disorders or other conditions.

Another potential benefit provided by the health model of the system and method may be to distinguish user specific health problems, where otherwise the user specific abnormalities may generally appear unremarkable. That is, since the method and system observe and incorporate a user specific health baseline into the health model, small variances of the user health state maybe observed while otherwise these variances would look unremarkable as compared to general population data.

2. Method

As shown in FIG. 1, a method for providing personalized feedback can include collecting a set of biometric inputs S110, determining a feedback treatment plan based on processing of the biometric inputs S120, and delivering feedback based on the feedback treatment plan S130.

The method may function to provide real-time unobtrusive high-level feedback to a user, based on real-time physiological data from the user, and learned physiological trends and responses of the user. The method may additionally be used to promote awareness of the user's mental and physical state and aid the user to maintain or reach a healthy mental and/or physical state. Generally, the method enables monitoring and learning the norms and difficulties of a user's state, making the user aware of these states, and aid the user in reaching and adopting a "healthy" state by providing user-specific feedback. In specific cases, the method may help better understand a user's stress levels and administer haptic feedback and/or other forms of biofeedback, based on the stress trends and responses of the user, to reduce the stress levels of the user.

The method may be used for providing biofeedback (e.g., haptic feedback, audio feedback, and/or visual feedback), behavioral intervention feedback (e.g., informational/digitally interactive interventions provided through user interface output), and/or pharmaceutical usage feedback.

In a variation where the method is used for biofeedback, the method may be used in providing haptic biofeedback but may additionally or alternatively be used for delivering visual biofeedback, auditory biofeedback, and/or any suitable type of feedback. The biofeedback can be any active stimulus outputted by one or more computing devices of the user that corresponds to the status of one or more of a user's physiological parameters. This may be done so that the user can control and/or otherwise respond to or notice such physiological parameters.

Accordingly, the method variation used for biofeedback as shown in FIG. 2 may include collecting a set of biometric inputs S110, determining a biofeedback treatment plan based on processing of the biometric inputs S120, and delivering biofeedback based on the biofeedback treatment plan S132.

In some variations, the biofeedback may be delivered as part of guidance for the user in performing (and/or not-performing) one or more actions. In one variation, the method can be used in guiding a user through a breathing exercise, where the biofeedback execution is synchronized with biological signals of the user. More specifically, feedback can be delivered that is coordinated with the periodicity of a heart rate variation signal such that a user can use the feedback as a point of reference for regulating respiration in such a way that the user's body may have a physiological response (e.g., HRV of the user increasing). Alternative forms of biofeedback may be used to guide mindfulness exercises, physical exercises (e.g., performing particular body motions), and the like.

In addition to or as an alternative to providing biofeedback, the method may be used in providing behavioral feedback interventions. Such behavioral intervention feedback can be delivered through user interface output of a computing device. The behavioral intervention feedback can be delivered to communicate information to a user. In some variations, the behavioral intervention feedback can be used in delivering cognitive behavioral therapy digital interventions. Cognitive behavioral therapy (CBT) can be characterized as a psycho-social intervention with an objective to reduce symptoms of mental health conditions. This can be used in treating depression, anxiety disorders, and/or other mental health conditions. The digital interventions may be digital communications (push notifications, chat messages, in-app graphics). The digital interventions may alternatively be digital interactions. For example, an interactive quiz may be delivered on demand in response to the biometric inputs and the feedback treatment plan.

Accordingly, in some variations, as shown in FIG. 3, a method variation for behavioral intervention feedback may include collecting a set of biometric inputs S110, determining a feedback treatment plan based on processing of the biometric inputs S120, and delivering behavioral intervention feedback based on the feedback treatment plan S134. This may include triggering a digital communication or an event that includes cognitive behavioral therapy information. Block S134 may be part of S130 and used in combination with providing other forms of feedback like in block S132.

The method may be performed in connection with or by a wearable computing device, wherein the wearable computing device can facilitate monitoring biometric signals and/or delivering biofeedback. In one exemplary variation, a wearable computing device such as a watch, health monitoring jewelry (e.g., a bracelet, ring, or necklace), patch, heart-rate monitoring band, smart headphones, smart glasses, and/or other suitable types of health monitoring devices can be used in collecting at least a portion of the biometric input data and/or used in delivering the biofeedback through a user interface output such as a visual display, speakers, and/or haptic output element. In some instances, the method may be implemented with coordinated operation of two or more computing devices. For example, one or more biometric data inputs may originate from one device and biofeedback may be delivered in part or whole by a second device.

The method may alternatively be performed in part or whole separate from such devices. In some variations, biometric signals, at least in part, may be detected and communicated from an outside device. As one example, a desktop computer application may be authorized to access health data of a user, and then provide suitable visual or auditory notifications on the desktop computer as a form personalized biofeedback. In some variations, biofeedback may be actively delivered, in part or whole, by an outside device, but the method may be used in determining at least a portion of the user interface output communicated through the outside device.

The method may be applied to analysis and dynamic delivery of biofeedback based on heart rate variability (HRV) of a user. As shown in FIG. 4, a variation of the method can include collecting a set of biometric inputs comprising at least heart rate activity data (S110), generating a heart rate variability signal from the heart rate activity data S112, determining a feedback treatment plan based on processing of the biometric inputs (S120), which comprises analyzing the heart rate variability signal S122, and delivering feedback based on the feedback treatment plan S132.

Figure 5:
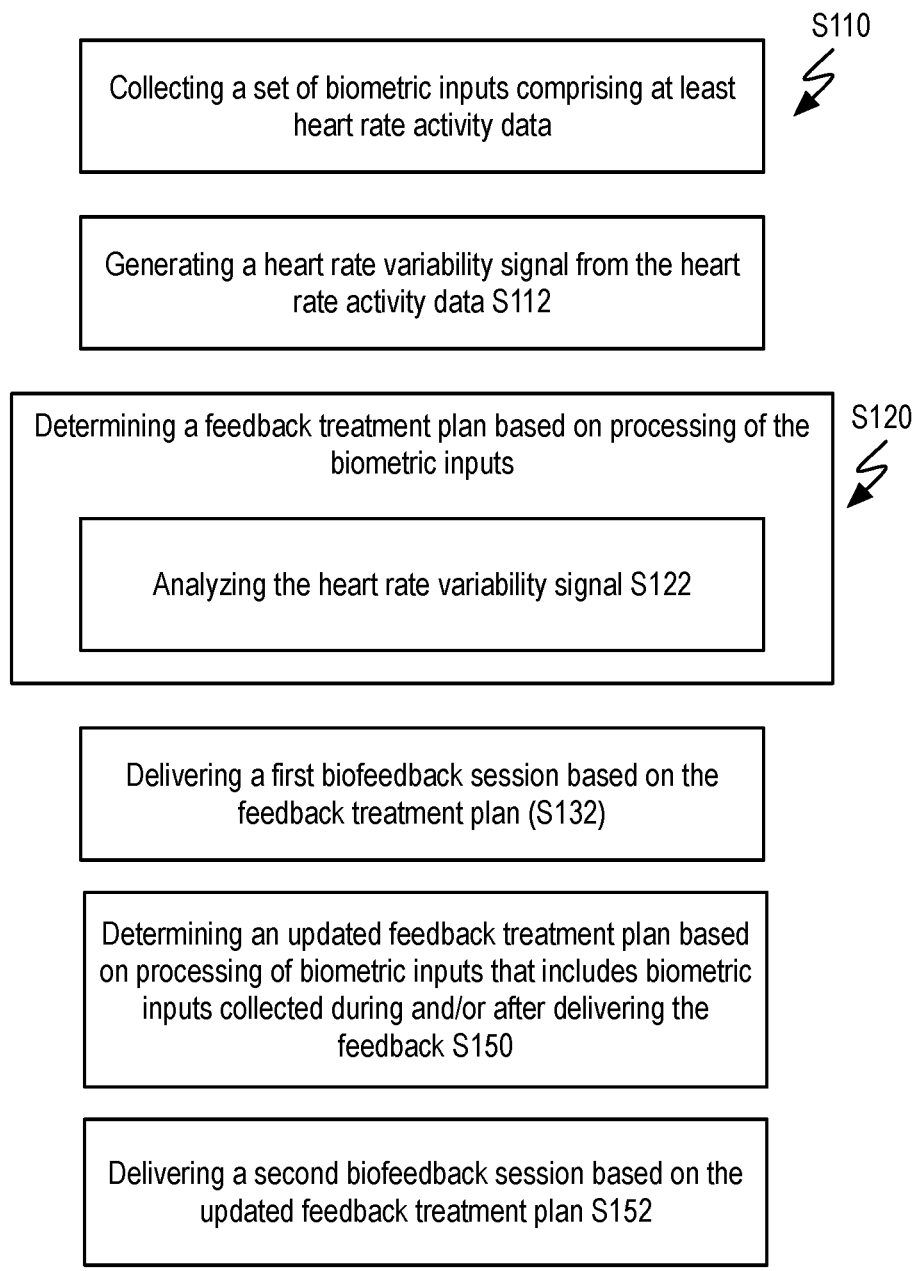
FIG. 5 is a flowchart representation of a method variation updating biofeedback based on updated feedback treatment plan.

In some variations, the method may be performed wherein collecting the set of biometric inputs is performed during and after the delivering feedback, which functions to enable feedback treatment plan to incorporate analysis of the response during administration of the biofeedback intervention and/or response after the administration of the biofeedback intervention. In this way, method can enable dynamic enhancements to the effectiveness of successive biofeedback sessions. As shown in FIG. 5, a variation of the method applied may be characterized as: collecting a set of biometric inputs comprising at least heart rate activity data (S110), generating a heart rate variability signal from the heart rate activity data S112, determining a feedback treatment plan based on processing of the biometric inputs (S120), which comprises analyzing the heart rate variability signal S122, delivering first biofeedback session based on the feedback treatment plan S132; determining an updated feedback treatment plan based on processing of biometric inputs that includes biometric inputs collected during and/or after delivering the feedback S150. This will generally be accompanied by delivering a second biofeedback session based on the updated feedback treatment plan S152. This can similarly be adapted for other forms of feedback such as behavioral intervention feedback.

In some variations, this may be modified such that feedback can be dynamically adjusted in real-time based on real-time biometric inputs. For example, how a biofeedback session is administered can automatically adjust and change according to the user's real-time response during that session.

The method can preferably incorporate use of one or more machine learning (ML) model in the process of determining the feedback treatment plan. Accordingly, the method can include collecting a set of biometric inputs S110, processing the biometric inputs as model inputs into a machine learning model, the model outputting at least one parameter of a feedback treatment plan (S120), and delivering feedback based on the feedback treatment plan S132.

Figure 6:
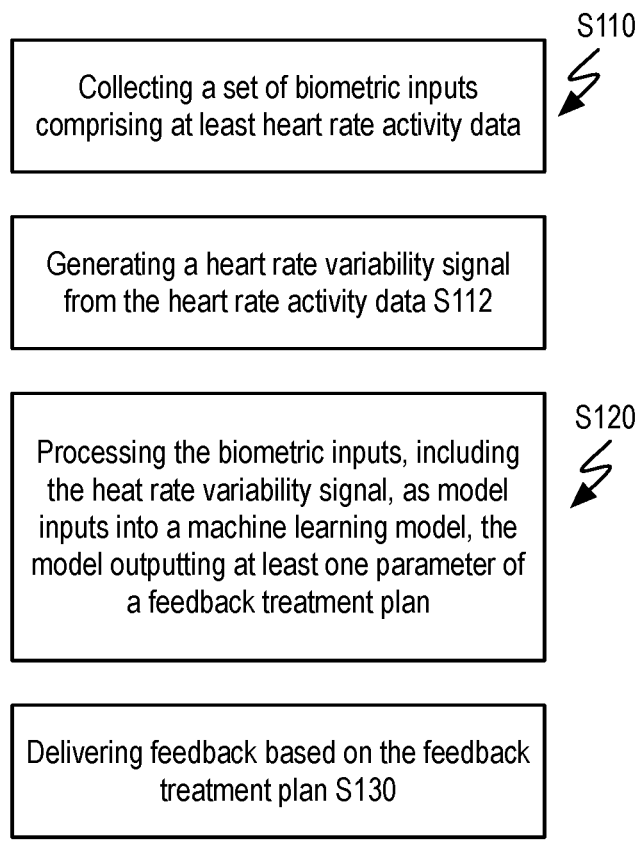
FIG. 6 is a flowchart representation of a method variation using machine learning for personalized biofeedback.

The method may additionally include training and/or updating one or more ML model. As shown in FIG. 6, a variation of the method applied to HRV variation can include collecting a set of biometric inputs comprising at least heart rate activity data (S110), generating a heart rate variability signal from the heart rate activity data S112, processing the biometric inputs, including the heat rate variability signal, as model inputs into a machine learning model, the model outputting at least one parameter of a feedback treatment plan (S120), and delivering feedback based on the feedback treatment plan S132.

In some variations, in addition to the biometrics being used as inputs, the parameters of past biofeedback treatment sessions or other types of information related to a previous/ current feedback treatment plan(s) may be used as inputs to a ML model. Accordingly, method variations may include processing the biometric inputs in combination with parameters of a current or previous feedback treatment plan as model inputs into a machine learning model, the model outputting at least one parameter of an updated feedback treatment plan.

The feedback treatment plan may be altered in a variety of ways. Some variations may vary scheduling of sessions (e.g., time between of sessions, time of day of sessions, etc.), session durations, session targets (e.g., HRV target thresholds), and the like. One or more parameters of the feedback treatment plan (determined in S120) may be controlled. In some cases, these parameters may be determined using data analysis processing of the biometric inputs. In some variations, a machine learning model or other suitable health model may be used in determining dynamic parameter values.

In one method variation, the at least one parameter of the biofeedback plan (determined for the feedback treatment plan) may be a timing parameter for when a biofeedback session is initiated. Such an initiation timing parameter can function to determine when biofeedback sessions would be helpful. This timing parameter may be based on time between sessions, response to biometric events/conditions, absolute timing (e.g., time of day). Such timing parameters and determination may additionally incorporate other external input parameters such as time of pharmaceutical use, time of meals, sleep schedule, calendar events (e.g., meeting times), and/or other parameters.

In one method variation, the at least one parameter of the biofeedback plan (determined for the feedback treatment plan) may be a timing parameter for duration of a biofeedback session. Such a duration timing parameter can function impactor determine how long a biofeedback session could last. Such a duration timing parameter may be the set amount of time for how long a biofeedback session is administered but may alternatively be the minimum amount of time of a session and/or the maximum amount of time of a session. For example, some users may respond better to shorter sessions while others may benefit from longer sessions. Effectiveness to different biofeedback durations may change based on various factors which may be dynamically managed by the method.

In one method variation, the at least one parameter of the biofeedback plan (determined for the feedback treatment plan) may be an HRV target parameter for a biofeedback session. The HRV target parameter. Other target parameters may additionally or alternatively be used such as number of breath repetitions, duration of breaths, and/or other suitable factors. In one example, an HRV target may be set for a session, where it is used in combination with a minimum and maximum time window parameters for guiding the session. In such an example, if the HRV target has been satisfied and the minimum session time duration is satisfied, then the session may end. Alternatively, if the maximum session time duration is satisfied, then the session may end regardless of the HRV.

Figure 7:
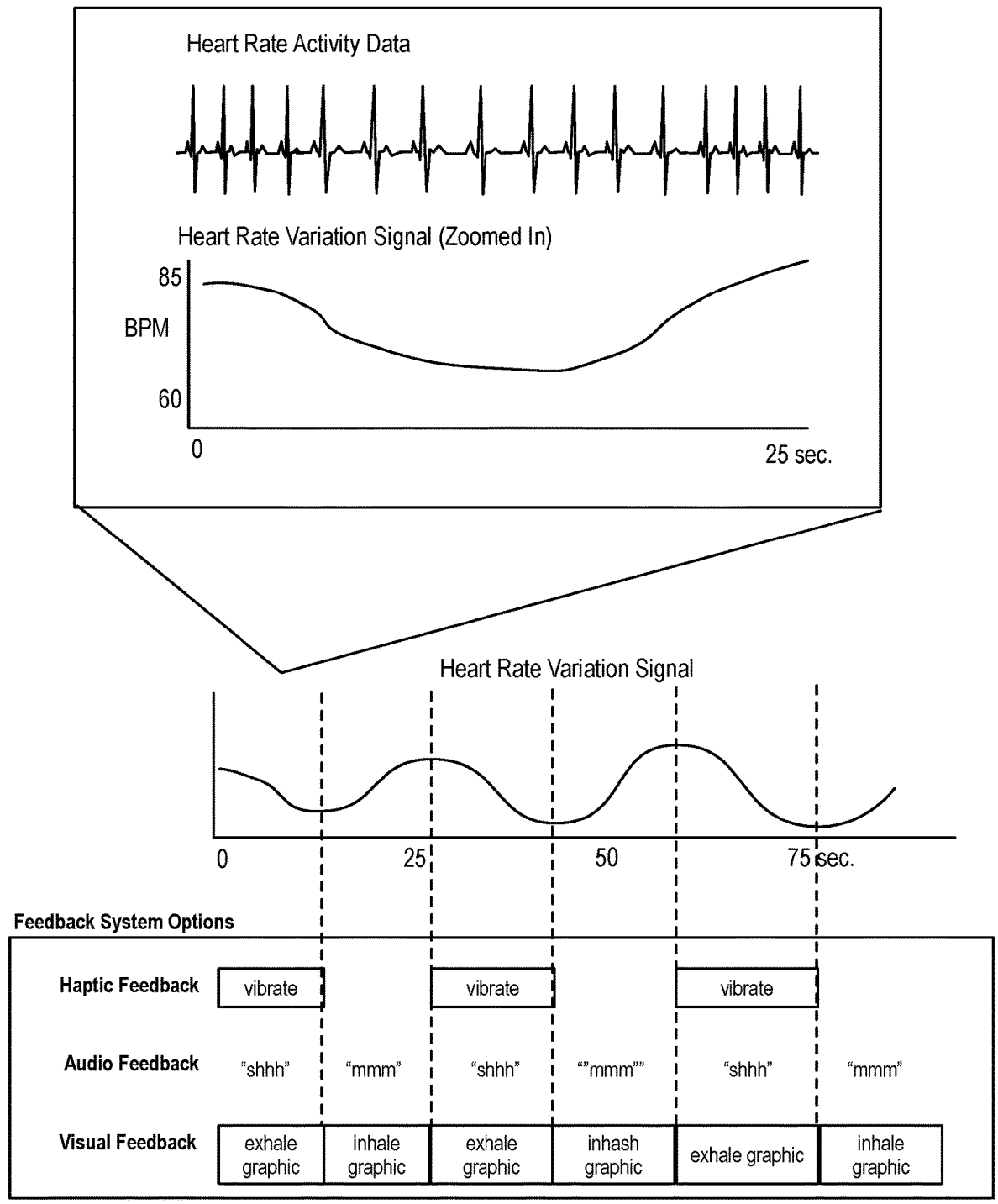
FIG. 7 is a diagram representing synchronization of biofeedback to a heart rate variability signal.
Figure 8:
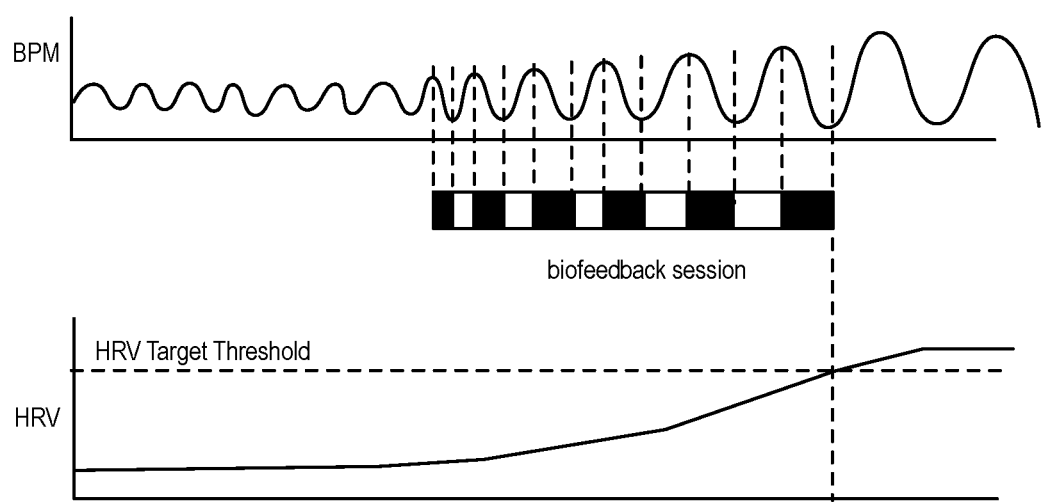
FIG. 8 is a diagram representing application of synchronized biofeedback and ending session conditional on an HRV target threshold.

As another potential method variation, the biofeedback, and more specifically the activation of feedback during a biofeedback session, may be synchronized with a heart rate variance signal. Accordingly, a variation of the method can include collecting a set of biometric inputs comprising at least heart rate activity data (S110), generating a heart rate variation signal from the heart rate activity data S112, determining a feedback treatment plan based on processing of the biometric inputs (S120), which comprises analyzing the heart rate variability signal S122, and delivering feedback based on the feedback treatment plan S132, wherein delivering feedback comprise activating feedback in synchronization with the heart rate variation signal as shown in FIG. 7. In some cases, such guided biofeedback may result in improvements in the HRV signal. As shown in FIG. 8, the HRV signal can be monitored during such a heart rate variation synchronization to yield improved increase in HRV. Additionally, an HRV target threshold may be used to determine when to end a biofeedback session.

Activating feedback in synchronization preferably involves changing the magnitude in coordination with a periodic pattern of the heart rate variation signal. Heart rate variation signal can be the real-time heart rate signal, which can function to show how the heart rate can vary over time. In one implementation, the instantaneous heart rate (beats per minute) can be calculated between every adjacent heartbeat signals (i.e., the "R-R interval" or "inter-beat interval"). For example, the time between each spike in the heart rate activity signal may be used to divide 60 seconds to arrive at an instantaneous beats per minute. When done between each heart beat a fluctuating heart rate variation signal can be generated. An HRV signal may be derived by looking at the variance of the heart rate variation signal over a given time window. Synchronized biofeedback can include activating feedback aligned to a first phase point of a heart rate variation signal (e.g., a local maximum or minimum) and deactivating feedback aligned to a second phase point of the heart rate variation signal (e.g., local minimum or maximum. In one example, haptic feedback, visual feedback, and/or audio feedback may be set to an active state at a local maximum of the heart rate variation signal (e.g., or at a defined offset from the local maximum of the heart rate variation signal) and then set to a deactivated state at a local minimum of the heart rate variation signal (e.g., or at a second defined offset from the local minimum). In an alternative example, haptic feedback, visual feedback, and/or audio feedback may, in a similar manner, be set to an active state at a local minimum of the heart rate variation signal (e.g., or at a defined offset from the local minimum of the heart rate variation signal) and then set to a deactivated state at a local maximum of the heart rate variation signal (e.g., or at a second defined offset from the local maximum).

In such variations, determining a feedback treatment plan based on processing of the biometric inputs can include determining at least one feedback synchronization parameter. A feedback synchronization parameter can specify phase alignment for feedback activation, phase offsets for activation and/or deactivation, duration of activation and/or deactivation during synchronized feedback, and/or other properties that alter how synchronized biofeedback (e.g., synchronized heart rate variance biofeedback) is delivered. This may be used to enable altering phase of alignment, feedback activation windows, or other properties for automatically guiding a user to correct breathing alignment. Interpreting feedback such as vibrations, visual instructions, and/or audio instructions may be subjective and so the system may automatically detect how a user is individually interpreting biofeedback and adjust feedback delivery to compensate and adapt feedback to how the user is performing instructed actions. This may enhance biometric results from biofeedback.

While activating and deactivating feedback is described, the feedback activation may alternatively be changed from one state to another such as changing a pattern of vibration, intensity of vibration, altering visual or audio communication, and/or making other suitable changes.

Figure 9:
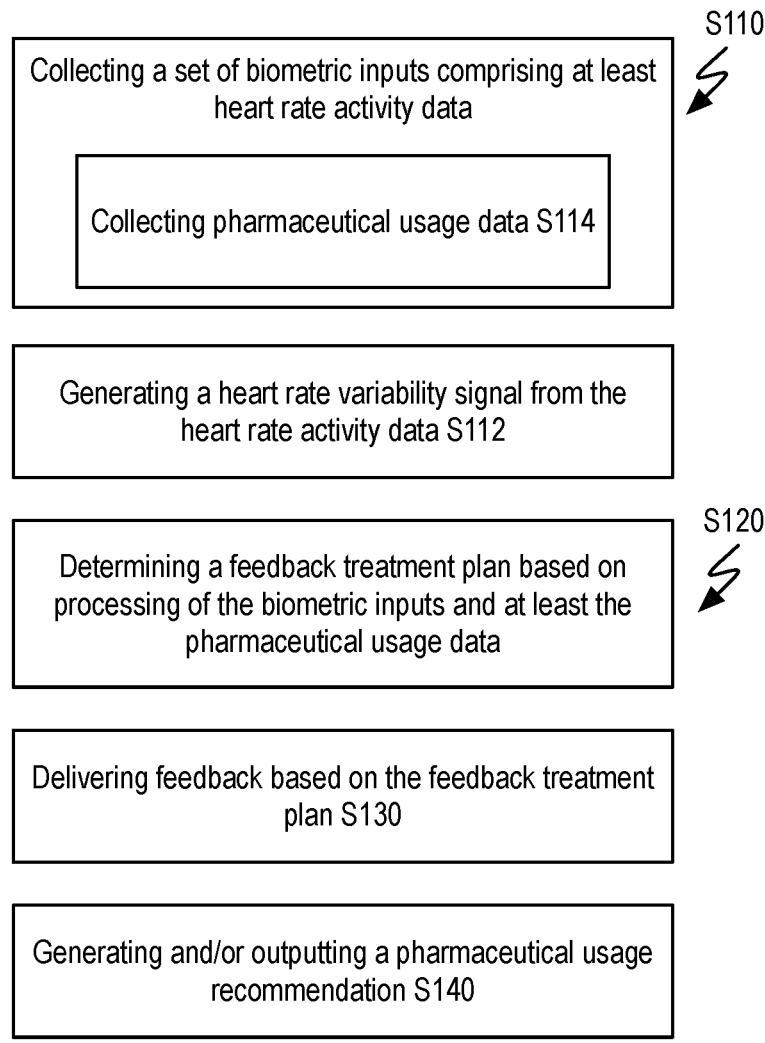
FIG. 9 is a flowchart representation of a method variation incorporating pharmaceutical usage data.

As another potential variation, the method may be adapted to incorporate and/or impact pharmaceutical usage. In one variation, data inputs related to pharmaceutical usage may be used to adjust biofeedback. Accordingly, a method variation may include, as shown in FIG. 9, collecting a set of biometric inputs S110 including collecting pharmaceutical usage data S114, determining a feedback treatment plan based on processing of the biometric inputs and at least the pharmaceutical usage data S120, and delivering feedback based on the feedback treatment plan S132. Such a method may include analyzing pharmaceutical usage data wherein determining the feedback treatment plan is based on the analysis of the pharmaceutical usage data. In some cases, analyzing pharmaceutical usage data may be performed in combination with analyzing physiological response of a user indicated through the biometric inputs in response to feedback treatment plan. This can function to determine now pharmaceutical usage impacts biometrics with consideration of the impact of providing biofeedback. For example, how and when a biofeedback session is performed can dynamically change based on the prescription for a patient, the dosage for a patient, and the when the patient took their medicine.

In some variations, the method may additionally be used for outputting recommendations or instructions regarding pharmaceutical usage. This can include determining if a change in medicine is recommended, a change in dosage, recommendation on when medicine should be taken. Such recommendations can be translated and converted into digital, electronic communications delivered to the user and/or a caregiver. Accordingly, in some variations, the method may additionally include generating and/or outputting a pharmaceutical usage recommendation S140. Pharmaceutical usage recommendation can include recommendations on changes or type of pharmaceuticals for use (e.g., suggesting medicine changes), recommendations on dosage, recommendations on timing of usage, and the like. Such pharmaceutical-based output may be more generally a pharmaceutical usage report which may more broadly report on detected aspects of pharmaceutical usage such as predicted time of usage, a report on effectiveness of the pharmaceutical as it impacts biometric signals, indication of changes in effectiveness, and/or a report on effectiveness of impact of pharmaceutical usage on biofeedback interventions.

Incorporation of treatment information may additionally be used in evaluating and monitoring effectiveness of external treatments, augmenting application of treatment for enhanced results, and/or tracking use of treatment (e.g., for reporting under or overuse of treatment). In a variation of the method incorporating monitoring of pharmaceuticals, the method may additionally include logging external treatment X105. Logging external treatment may be used in determining a health state of the user from the biometric data in the context of the treatment. In some variations, a health model trained on impact of pharmaceuticals may not depend on logging of external treatment but can instead automatically detect or predict external treatment. For example, the method may predict when a user uses a pharmaceutical or drug by processing the biometric data using the health model. In other cases, the physiological effectiveness, side effects, improvements, deterioration, or other aspects may be classified through a trained health model based on the sensed data of a user in X110. Logging treatment information in one variation can include recording an assigned prescription regimen. For example, the expected schedule and amount of a drug can be defined. In another variation, logging treatment information can include user-reporting instances of administration of a pharmaceutical. For example, a user application can facilitate recording time, amount, and type of a drug, which would presumably be entered by a user or a caregiver.

Block S110, which includes collecting a set of biometric inputs, functions to obtain data related to the biological state of a user. The biometric inputs may be real-time biometric inputs, where real-time reflects how the inputs are continuously or periodically collected to characterize a current state of the user. In some cases, the biometric inputs may only need periodic sampling to provide substantially real-time signals. Periodic sampling can include sampling every 1-60 minutes (e.g., every 1, 5, 10, 15, 20, or 30 minutes), every hour, a set number of times during the day (e.g., morning, afternoon, night), and/or every day. Some variations may be scheduled or on-demand collection of biometric inputs.

Collecting the set of biometric inputs may include or be performed by sensing biometric data from the user. Sensing data from a user may include sensing biometric physiological data (e.g., heart rate, breathing rate, temperature, perspiration rate, blinking rate, blood pressure, cranial electric activity, muscle twitch). The method may additionally or alternatively include collecting or sensing other types of user data (e.g., GPS position, rate of movement, direction of movement).

The biometric inputs of one variation can include at least heart rate activity data. Accordingly, in some variations, collecting the set of biometric inputs includes sensing or otherwise collecting heart rate activity data. The heart rate may additionally be converted into a heart rate variability signal that characterizes the change of heart rate and thereby shows the heart rate as a function of time.

An additional or alternative biometric input may include breathing activity data (e.g., the breathing rate of the user). The breathing activity data can be or serve as a breathing (or respiration) signal, which can characterize rate of breaths. More specifically, a breathing signal can characterize timing, rate, length, and/or magnitude of an inhalation and/or an exhalation. Sensing respiration rate may include collecting motion data of the body (e.g., on the chest, stomach, shoulders, or head) and detecting periodic patterns of movement that are converted into a breathing activity data. Sensing respiration rate may alternatively or additionally include collecting audio data and detecting breathing audio signals which may be used in determining breathing activity data.

The physiological data is preferably sensed from a sensor on one or more devices worn by a user. The device may be a dedicated biometric sensing device. The devices used in collecting physiological data may additionally include wearable computing device such as a smart watch, smart jewelry, headphones, glasses, and the like. In one variation, the physiological data can be a composite of sensor data from a variety of sample points on the body. Collecting physiological data can include sensing data from a biosensor. Alternatively, collection physiological data can include retrieving data from a secondary device such as through a communication. For example, a second device, such as a smart watch, may collect heart rate data, and the heart rate data can be communicated to an application or device of the method.

Heart rate activity may be sensed or collected to facilitate monitoring the heart rate (i.e. pulse) and heart rate related data of the user. Heart rate related data preferably includes heart rate variability (HRV). Heart rate data may additionally or alternatively include other heart rate related data, such as pulse strength and pulse irregularities. Heart rate data can be collected by an ECG sensor, an electroencephalogram (EEG) sensor, an electromyography (EMG) sensor, a galvanic skin response (GSR) sensor, a photoplethysmography (PPG) sensor, an infrared spectroscopy (NIRS) sensor, a photoplethysmography (PPG) sensor, and/or any suitable type of heart rate detection device. The heart activity data is preferably collected with a sampling resolution sufficient to produce a real-time analysis of heart rate variability. The sampling frequency of instantaneous heart activity is preferably at least twice that of expected heart rate variability frequency.

In a variation where the biometric inputs include heart rate activity data, block S110 may include generating a heart rate variability signal from the heart rate activity data S112, which functions to determine HRV, which may be used in evaluating health state and/or as a biofeedback reference signal when delivering feedback.

Breathing activity data may be sensed or collected to facilitate monitoring respiratory rate and breathing related data of the user. Breathing related data preferably includes time length of an inhalation and time length of an exhalation. Breathing related data may additionally or alternatively include elapsed time between end of an inhalation and start of an exhalation, chest/diaphragm expansion during inhalation, chest/diaphragm contraction during exhalation, respiratory rate variability, and breathing irregularities. In some variations, that may include an initial calibration, sensing the breathing rate of the user may additionally or alternatively measure respiratory volumes (e.g., tidal volume) during breathing. Breathing related data may be collected by a breath sensor but may alternatively be inferred through another signal. In one variation, heart rate variation signal can be used in computing respiration.

The method and/or block S110 may additionally include sensing or collecting non-biometric data, such as location (e.g., GPS) and movement (e.g., accelerometer) monitoring. Sensing non-biometric data may function to assist and improve understanding the health state of the user. For example, a healthy breathing rate of the user may vary at different pressures (e.g., at different elevations), wherein different pressures can be considered with location sensing or a barometer. Another example would be explaining increased breathing rate and/or heart rate during increased activity (e.g., running), which can be considered with monitoring of movement.

In some variations, the method may incorporate tracking of pharmaceutical usage. Accordingly, the method may include collecting pharmaceutical usage data S114, which functions to take in data related to pharmaceutical usage. The pharmaceutical usage data can include the name or type of medicine or drug being used by a user, the dosage amount and frequency, and/or the time of usage. Such data may be collected through a user interface of an application. For example, a user may log when any medicine is taken. Alternatively, pharmaceutical usage data may be part of configuration data entered by a caretaker for a user. In yet another variation, a smart device (e.g., a network connected smart pill dispenser) may update a database with pharmaceutical usage data. This body intake data may additionally or alternatively include nutritional/diet data, exercise/activity data, and/or more behavioral/activity data.

Block S120, which includes determining a feedback treatment plan based on processing of the biometric inputs, functions to determine at least one aspect for how biofeedback may be administered for a user.

In some variations, the feedback treatment plan is determined such that biofeedback is delivered so as to have the interventions target achieving real-time changes in physiological signals. As one such variation, block S120 may be applied so that breathing exercises guided through biofeedback are used to promote increases in HRV of a user. This may be used to keep the user in an HRV target range at all times or for some portion of time.

In an additional or alternative variation, the feedback treatment plan may be determined in a way to customize the delivery and administering of the biofeedback so as to be customized to the user. This may function to enhance the effectiveness of biofeedback sessions. For example, breathing exercises based on biofeedback-based user interface may be interpreted and/or performed in different ways by users. Accordingly, the way in which biofeedback is delivered could be customized to guide users to similar execution of an exercise independent of how they interpret biofeedback signals.

In some variations, the feedback treatment plan may be dynamically adjusted according to assessment of the health state of the user. For example, machine learning model processing of the biometric inputs may be used to determine if or when a user is suffering from depression or anxiety. As will be discussed, an assessment of the health conditions of the user may be used to select a corresponding feedback treatment plan.

Determining the feedback treatment plan, of one variation, can include analyzing a heart rate activity data. In particular, heart rate variability may be used in some variations as one key metric for determining a feedback treatment plan. Accordingly, determining the feedback treatment plan, of one variation, may include analyzing the heart rate variability signal S122. Analyzing the heart rate variability signal may be used to evaluate the current level of HRV. In one variation, biofeedback treatment may be triggered based on a threshold of HRV value. For example, if average HRV drops below a set threshold, then biofeedback session may be triggered.

Other suitable conditions may also be evaluated in combination with a condition based on current or running average HRV value. For example, the maximum or minimum number of biofeedback sessions in a time period, a minimum or maximum time between biofeedback sessions, conditions on when biofeedback sessions are permitted or restricted, and/or other conditions.

Analyzing the HRV signal may additionally be used in evaluating effectiveness of a biofeedback session. This may be used to score and/or measure the effectiveness of a precedingly delivered biofeedback session. This may be used, for example, to compare different parameters of a biofeedback session to see how the HRV response changes. For example, the method may analyze HRV to determine if a user responds better to a biofeedback session of 30 second duration or to a 2-minute duration. In some instances, it may be desirable to target biofeedback sessions that result in a longer duration of elevated HRV.

In addition to analyzing the HRV signal, block S120 may include analyzing non-biometric data, activity data, emotional survey input data (e.g., app logged mental states of a user), pharmaceutical usage, and the like.

For pharmaceutical usage data in particular, analysis may be used to determine how biofeedback can be balanced with pharmaceutical usage. In some cases, predicting and modeling drug responses of a user can be used so that biofeedback sessions can be scheduled and administered when they may maximize their effectiveness.

Determining the feedback treatment plan based on processing of the biometric inputs S120 in some variations can include processing the biometric inputs as model inputs into a machine learning model. The ML model can output at least one parameter of a feedback treatment plan. In particular, inputs such as a time series dataset of the HRV signal, past parameters of biofeedback sessions, pharmaceutical usage data, emotional input data, activity data, and/or other data inputs may be supplied to the machine learning model. The machine learning model may be a deep learning model, a neural network, and/or any suitable learning model. Processing may include incorporation of multiple machine learning models and/or other processing processes as part of a machine learning processing pipeline.

Another source of inputs used to train a ML model and/or to generate outputs of the ML model can be other digital data sources. Digital data sources may include calendar event data, health data (e.g., logged by exercise/health monitors). In the case of calendar event data, the method may include connecting a digital calendar of the user; and then determining the feedback treatment plan based on processing of the biometric inputs in combination with calendar event data. This may be used so that patterns in the calendar event data can be detected and used in determining aspects of the treatment plan such as timing of biofeedback and/or behavioral intervention feedback, and/or parameters of how biofeedback or behavioral intervention feedback is delivered for a given session/intervention.

For example, the method may be able to automatically determine which events and when relative to an event a biofeedback session, behavioral intervention feedback, or other forms of feedback would be helpful. These could be physiologically based such that the feedback is administered to target improvements. For example, a user may receive HRV biofeedback sessions $_5$ minutes before more stressful types of meetings. The calendar event data may include event description, event location, event format (e.g., in-person, phone call, video call, etc.), attendees, and/or other parameters.

In another example, the method may connect to health-related data of the user. For example, a smart phone may have data on exercise activity, sleep/awake activity, app-usage activity, and/or other user-related insights. In the case where such data is time or event based, these may be used to determine suitable times for different types of feedback.

The method may include training of one or more machine learning model. For example, human managed administration of biofeedback sessions from a set of users may be tracked and monitored. This can be used to develop a machine learning model to predict physiological responses to biofeedback of different people, and/or to learn patterns on human-managed administration of feedback treatment plans.

In one variation, determining the feedback treatment plan can include applying reinforcement learning in determination of the feedback treatment plan. Method variations applying reinforcement learning can include selecting a permutation of parameter options for a feedback treatment plan for different conditions (e.g., sets of biometric inputs, digital data, pharmaceutical usage data, emotional state data, and the like), monitoring results, and adjusting policy (or model) for subsequent selection of permutations of parameter options. In this way, different options can be explored, and reinforcement learning can algorithmically determine appropriate treatment plans for different situations.

Determining the feedback treatment plan will determine at least one aspect or parameter of how biofeedback is administered for a user. In some variations, multiple aspects can be determined. Determination of feedback treatment plan can determine patterns on a macro-scale for how multiple sessions are administered (e.g., timing between sessions). Determination of feedback treatment plan can additionally or alternatively determine properties of how a single biofeedback session is administered.

Determining the feedback treatment plan can include determining a timing parameter for when a biofeedback session is initiated. This can be used to determine a recommended time for administration of biofeedback. This may be specified on an absolute time scale (e.g., at noon) or relative to other events or biofeedback sessions (e.g., 3 hours after last biofeedback session or after taking morning medicine). Session initiation timing parameters may alternatively be on-demand signals. For example, determining the feedback treatment plan may be used to output an event trigger when biofeedback should be triggered. This may be used to perform on-demand biofeedback when conditions are right.

Determining the feedback treatment plan may additionally or alternatively include determining parameter for an individual biofeedback session, which functions to determine how feedback of a session is delivered.

Parameters of a biofeedback session can include determining a timing parameter where the timing parameter is a parameter for duration of a biofeedback session. For example, the timing parameter could be the minimum or maximum amount of time for a biofeedback session.

Parameters of a biofeedback session can include determining target parameters of a biofeedback session. For example, a target HRV parameter may be set as a threshold wherein if the user achieves the HRV value specified by the target HRV parameter during a session, the session may end, or some other action may be triggered. Different users may have different target HRV parameters.

Parameters of a biofeedback session can include determining a feedback synchronization parameter. As discussed herein, some biofeedback variations may synchronize feedback to a physiological signal such as the heart rate variation signal. How the feedback is activated, deactivated, or otherwise "communicated" or delivered can be dynamically determined so that it can be customized for an individual user. In one preferred variation, determining a feedback treatment plan based on processing of the biometric inputs includes determining at least one heart rate feedback synchronization parameter. The heart rate feedback synchronization parameter can define activation/deactivation magnitude values, phase alignment of feedback state to heart rate variation signal, phase alignment offsets of feedback states, and/or other parameters.

Determining of a feedback treatment plan can be applied in a variety of ways depending on objective and application of the method. Some exemplary variations are described herein, but one knowledgeable in the art would appreciate that the method is not limited to only these variations.

In one variation for treatment or training, feedback may be used to improve HRV by delivering feedback to promote keeping HRV in a target range. HRV can be a good indicator of a person's health and linked to many health issues. Dependent on the recommended treatment, or training, model the recommended treatment plan may be used to increase or decrease HRV. In one exemplary scenario as a stress reduction treatment, a stress reduction model may focus on lowering the HRV. In another exemplary scenario, a feedback treatment plan may focus on increasing HRV. In another example, a feedback treatment plan may adjust the range of target HRV (e.g., modifying the minimum and maximum HRV). These ranges and thresholds of target HRV may additionally be modified overtime to incrementally move a user to different HRV targets.

A feedback treatment plan configured to keep HRV in some range may additionally incorporate consideration of other factors such as how long HRV is kept at certain levels/ranges. This may be used to target keeping HRV above a certain threshold for some total amount of time each day. This may function to dynamically determine "titration" of biofeedback for enhanced (e.g., optimal) application of biofeedback.

Dependent on implementation, HRV metrics may be represented as root mean square of the successive differences (RMSSD), the natural logarithm of RMSSD(ln(RMSSD)), the standard deviation between heart beats (SDNN), or the number of pairs of successive heartbeat intervals that differ by more than 50 ms. (NN50). Dependent on implementation, a feedback treatment plan may implement any desired metric to measure HRV (e.g., RMSSD).

In a first variation for a feedback treatment plan to increase HRV, the feedback treatment plan includes a lower activation threshold to start providing feedback once the user HRV falls below the threshold; and a higher, deactivation threshold, to stop providing feedback once the user HRV rises above the threshold. That is, once the user HRV falls below the activation threshold, feedback is provided to the user to aid the user in raising their HRV. Once the user HRV has risen sufficiently high to reach the deactivation threshold, feedback is ceased.

For a second variation feedback treatment plan to decrease HRV, the feedback treatment plan may include an upper activation threshold, to start providing feedback once the user HRV rises above the threshold; and a lower, deactivation threshold, to stop providing feedback once the user HRV falls below the threshold. That is, once the user HRV rises above the activation threshold, feedback is provided to the user to aid the user in lowering their HRV. Once the user HRV has fallen sufficiently to reach the deactivation threshold, feedback is ceased.

For a third variation feedback treatment plan to stabilize HRV, the feedback treatment plan may include an upper activation threshold and a lower activation threshold. Additionally, the feedback treatment plan may include at least one deactivation threshold (preferably two deactivation thresholds, one for each corresponding activation threshold) between the two activation thresholds. Once the user HRV rises above the upper activation threshold (or below the lower activation threshold), feedback is provided to aid the user in lowering (raising) the user HRV. Once the user HRV falls (rises) sufficiently to reach the deactivation threshold, feedback is ceased. This variation functions to keep the HRV within a designated range.

As part of a determining a feedback treatment plan, both activation and deactivation thresholds may change over time, in response to "improvements" in user response. In preferred variations, implementing supervised learning or other forms of modeling, initial activation/deactivation thresholds can be set. In some variations, these may be reviewed, optionally modified, and then committed for use in treatment by a professional (e.g., doctor or physical trainer). These initial conditions may be set from average values for HRV, within some range of measured biometric data of the user, or through some other desired considerations. As the user progresses, the feedback treatment plan may adjust threshold values to bring the user closer to desired values, and/or to improve the user response. For example, in the implementation to raise the HRV, as a user average HRV rises, the feedback treatment plan may gradually raise the activation and deactivation threshold. In another example, wherein the user struggles to reach the deactivation threshold, the model may decrease the span between the activation threshold and the deactivation threshold.

As another variation, HRV thresholds may dynamically change in response to various conditions. For example, the deactivation HRV threshold may change as a function of the current HRV and/or duration of feedback. For example, if the progress towards the default HRV deactivation threshold during a feedback session (e.g., during active feedback) does not meet some metric, then the deactivation threshold may be augmented (e.g., adjusted for more achievable deactivation). As an alternative example, if the HRV activation threshold is set such that feedback is not activated for two days, then the activation threshold may be adjusted to better customize targets for the user.

The type and delivery of the feedback may be performed in a variety of ways. In some variations, the delivery of feedback may dynamically adjust and be a learned parameter customized to a particular users or group of users (e.g., users in an age group or in some other class).

In addition to the HRV-based threshold conditions for activation and/or deactivation, there may also be other evaluated conditions for activation and/or deactivation. These additional feedback conditions are preferably evaluated in combination with the HRV-based threshold wherein feedback may be activated/deactivated based on HRV state as well as other conditions. There may be a condition on the count of feedback treatment "sessions", the duration of feedback treatment for one or more different time periods, time between feedback treatment, and/or other conditions. As one example, a treatment condition may specify a maximum number of treatments sessions in one day. As another example, a treatment condition may specify maximum amount of time in which feedback is delivered for any given session or during some time window (e.g., one day or one day). In this example, if the HRV does not achieve the deactivation threshold within 3 minutes it may deactivate regardless. These feedback conditions could additionally be dynamically adjusted algorithmically or in any suitable way.

In some variations, biofeedback session involves delivery of haptic feedback delivered to at least one point on the body of the user; wherein delivering feedback based on the feedback treatment plan includes providing haptic feedback as a series of pulses of varied length, intensity, and frequency. Through learning, the method may then change the recommended treatment, by changing the length, intensity, and/or frequency of the pulses.

In some variations, determining the feedback treatment plan can involve assessing health state and/or developing a model for dynamically customizing a biofeedback treatment. Machine learning may be used to automate predicting, scoring, or otherwise characterizing mental state. One such variation can include collecting biometric data of a user (e.g., heart activity data and/or HRV data) over time, prompting the user to fill out a mental health quiz used in making predicted assessment of mental health state, and then training a machine learning model for prediction of the mental health state given the biometric data. The completion of the mental health quiz may be be associated with biometric data during or preceding the quiz. Additionally, the method for generating a mental health state prediction may include collecting other data such as activity data (e.g., accelerometer data, health/activity data from a smart phone or other connected device, digital data like calendar data, and/or other data inputs). This may be used to understand if the user is lying down, moving around, and/or doing other activities at or around the time of the quiz.

Subsequent to training the machine learning model, the trained machine learning model may be used such that given the biometric data of a user, a mental health state prediction can be generated from the strained machine learning model. In some instances, this may be used to calculate a mental state score (e.g., a depression score). This may be used to generate predictive assessments of mental health state without making a user to complete a quiz each time. This may enable more real-time or at least more frequent assessments. Such assessments of mental health state.

Figure 10:
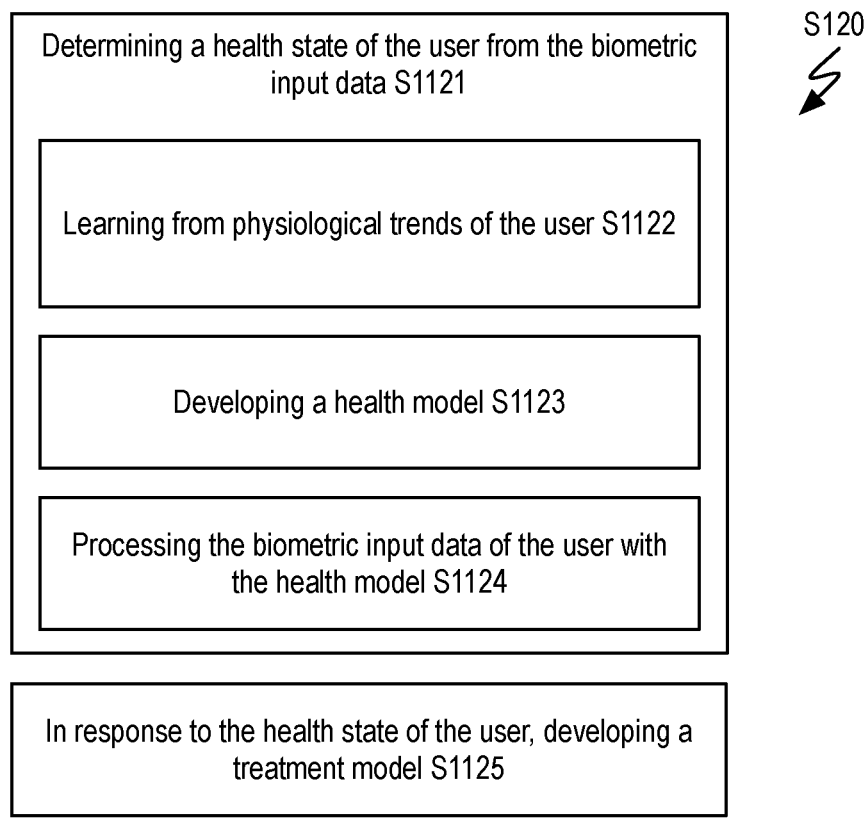
FIG. 10 is a detailed flowchart representation of process variations for determining a health state of a user.

In some variations, as shown in FIG. 10, block S120 may include determining a health state of the user from the biometric input data S1121, comprising learning from physiological trends of the user S1122, developing a health model S1123, and processing the biometric input data of the user with the health model S1124; and in response to the health state of the user, developing a treatment model S1125. The treatment model may serve as the biofeedback treatment model. The treatment model may alternatively be a model used in determining the biofeedback treatment model.

Block S1121, which includes determining a health state of the user from the biometric input data, may function to learn from the biometric data inputs of the user and to develop both a dynamic and a long-term understanding of the user health. Determining a health state of the user from the biometric input data may include learning from physiological trends of the user, developing a health model, and comparing the biometric input data of the user to the health model.

Generally speaking, determining a health state of the user from the biometric input data S1121, may enable applying machine learning and pattern analysis, at both an individual user level and a population of users' level, to understand distinct user norms and to understand general population norms; wherein the health state of the user can be determined by comparing the user biometric input data to the user norms and to the general population norms. Determining the health state of the user from the biometric input data may occur on many and/or multiple time scales, wherein the method preferably includes at least a dynamic (e.g., minute, daily) health state of the user. The health model may additionally include a long term (e.g., monthly or annual) health state of the user. Examples of dynamic health states may include: high stress, relaxed, intoxicated, narcotic effect (e.g., amphetamine). Examples of long-term health states may include: chronic fatigue, low-level poisoning (e.g., lead), steroid hormone imbalance (e.g., graves disease), and/or other suitable states.

The dynamic health state of the user may include analysis of short-term fluctuations of the user biometric input data, e.g., the health state of the user over a daily cycle. For example, determining the dynamic health state may determine that the user has typically a lower health state in the mornings (e.g., due to a stressful work commute). The long-term health state of the user may include analysis of general trends in the user biometric input data and comparison to general population norms to determine chronic and/or user specific distinctions in the health state of the user.

In some variations of the method, determining a health state may be replaced by or supplemented with results of an external evaluation. The external evaluation may be a questionnaire, form, or series of tests completed by the user and/or a medical practitioner. The external evaluation is preferably a report or summary that can provide or be used in determining the health state of the user. In one preferred variation, the external evaluation is used in combination with the use of biometric input data. In other variations, the method includes receiving the external health assessment and generating a health state of the user from at least the external evaluation.

External evaluation may be used to assist in setting starting conditions for either training or treatment purposes. For example, a medical professional or physical trainer, may incorporate healthy average biometric input data as starting/comparative state to compare to, determining a health state of the user from the biometric input data S1121.

Learning from physiological trends of the user S1122 may function in observing and determining the behavior of the user. Learning from physiological trends of the user preferably includes applying pattern and regression analysis to the data acquired from sensing data from a user X110. Additional and/or alternative analytical techniques (e.g., statistical analyses, application of models, machine learning) may be applied as desired. Learning from physiological trends of the user S1122 preferably creates a "baseline" health state for the user. Learning from physiological trends of the user S1122 may additionally observe and/or determine other dynamic health states (e.g., relaxed, high stress, active, illness, medicated).

Developing a health model S1123 may function in creating and updating a learning health model of the user health state. Developing a health model S1123 may comprise creating and updating a health model from the data of a single user, but preferably includes applying the method steps to a plurality of users. Developing a health model S1123 preferably occurs concurrent to other method steps but may alternatively occur at some other distinct time. In preferred variations, developing a health model S1123 is a continuous process.

The health model may function as a working and improving knowledge base of user health states and conditions. The health model may include health state norms and variations for the plurality of users. The health model may additionally and/or alternatively include health state norms and variations for individual users. The health model may additionally identify "healthy" and "unhealthy" health states and unique user health states. Training data from known individual states or self-reported states may additionally be used building a model for classifying particular conditions from physiological and other forms of user data. Individual user health state norms and variations may be directly incorporated from the learning from physiological trends of the user S1122, determined independently, and or determined in compliment with learning from physiological trends. As a working and improving knowledge base, the health model is preferably a dynamic knowledge base that, on average, improves over time.

Developing a health model S1123 preferably includes creating a health model. Creating a health model includes applying machine learning algorithms to data obtained from at least one user, but preferably to data obtained from the plurality of users. Learning algorithms may be of any type (e.g., supervised, semi-supervised, unsupervised). A single learning algorithm may be implemented in developing a health model or alternatively multiple learning algorithms may be implemented in developing a health model.

Through continued implementation of machine learning, the health model may be improved. Improving the health model preferably occurs through machine learning applied to data acquired from the plurality of users. Machine learning may identify correlations that relate specific (or general) health states to the user biometric input data.

Processing the biometric input data of the user with the health model S1124 is preferably a component of determining a health state of the user S1121. Processing the biometric input data of the user with the health model S1124 may function in identifying or classifying the user health state. As described previously, determining a health of the user may occur on multiple and different time scales. That is, processing the biometric input data of the user with the health model may lead to identifying a dynamic health state, a long-term health state, and/or a health state at other time scales. For example, processing the biometric input data may be used in classifying a long-term classification of a condition evident in the user data. In another example, processing the biometric input data may be used in identifying a particular event such as one where biofeedback may be beneficial. As the health model improves, identifying the user health state may additionally improve. Identifying the user health state improvements may come in the form of a more accurate health state determination, determination of new health states of the user, quicker determination of the health state of the user, and/or other improvements in health state determination.

In one preferred variation, the health model is a mental health model and determining a health state of the user S1121 may be implemented to determine the mental health state of the user. That is, user biometric input data may be implemented to determine the mental health state of the user. In addition to the machine learning implemented to develop the mental health model the mental health model may be connected to mental health databases to improve the health model. Examples of mental health states may include, high levels of stress, mentally relaxed, agitated, confused, psychotic episode, and/or any other alternative mental health states.

Block S1125, which includes developing a treatment model, functions in creating and/or updating a treatment model in response to the health state of the user. The treatment model is preferably a model that provides a recommended treatment to improve the health state of the user. The treatment model may be a learning model that attempts to learn from and thereby "intelligently" improve recommended treatment by utilizing the biometric data and the health state of the user. Particularly, by monitoring the effects of a recommended treatment on the user, the treatment model may adjust and/or change the recommended treatment in the feedback treatment plan. In preferred variations, developing a treatment model S1125 may include employing semi-supervised learning algorithms that utilize biometric data and the health state of the user, prior to and after the recommended treatment has been employed to improve the treatment model. Alternative types of learning algorithms may be employed as desired.

Block S130, which includes delivering feedback based on the feedback treatment plan, functions to provide some output resulting from the feedback treatment plan. The output is preferably based on processing and algorithmic analysis of biometric inputs. The output may additionally be based on other data inputs. Block S130 may include delivering feedback based on the feedback treatment plan S132, and/or delivering behavioral intervention feedback based on the feedback treatment plan S134. As a related output of the method, block S130 or the method more generally may include generating and/or outputting a pharmaceutical usage report S140 which may be a pharmaceutical usage recommendation, history log, information, or other formats of a report on the pharmaceutical usage.

Furthermore, different forms of feedback or outputs such as biofeedback, behavioral intervention feedback, and pharmaceutical usage output/feedback may be used in any suitable combination. For example, biofeedback may be delivered in coordination with delivery of behavioral intervention feedback and/or pharmaceutical usage. Similarly, behavioral intervention feedback may be used in coordinated combination with pharmaceutical usage feedback (with or without usage of biofeedback). As described herein, biofeedback is used as a primary example.

Block S132, which includes delivering biofeedback based on the feedback treatment plan, functions to execute and perform biofeedback in accordance with at least one parameter or other aspect specified in the feedback treatment plan. Delivering feedback may involve the administration of one or more biofeedback sessions. A biofeedback session, in one variation, is a window in which a user is guided through an exercise. In some variations, the guided exercise can be coordinated or based on biometric data. In one variation, a user interface output is updated to guide a user through a breathing exercise, where inhaling breaths and exhaling breaths are intended to be synchronized with periodic patterns of a heart rate variation signal (i.e., an instantaneous heart rate signal).

Feedback may be delivered in one or more ways. Delivering feedback may be executed, for example, by activating a haptic feedback system (e.g., a vibrational motor, electrical stimulation, or other type of haptic engine), an audio feedback system (e.g., a speaker), and/or a visual feedback system (e.g., updating a display or visual indicator).

In one variation, delivering feedback may be used in guiding synchronization of breath with feedback. In one variation, delivering haptic feedback includes synchronizing haptic feedback to a heart rate variation signal at select times. A user is preferably pre-trained or prompted in some other way to adjust breathing (e.g., inhalation and exhalation) to follow feedback signals.

For haptic feedback, the activation/deactivation state of haptic feedback system can be changed in synchronization with periodic fluctuations of the heart rate variation signal. More specifically, haptic feedback states associated inhalation and exhalation can be synchronized to different phase windows between local maximum and local minimums of the heart rate variation signal.

In a similar manner, for audio or visual feedback, the audio/visual state of an audio and/or visual feedback system can be changed in synchronization with periodic fluctuations of the heart rate variation signal. More specifically, audio/visual feedback states associated inhalation and exhalation can be synchronized to different phase windows between local maximum and local minimums of the heart rate variation signal. For a visual feedback system with a display, an inhale graphic may be displayed during a window synchronized with a phase window of the heart rate variation signal when a user should inhale, and an exhale graphic may be displayed during a window synchronized with a phase window of the heart rate variation signal when a user should exhale. Similarly, for an audio feedback system with a speaker, an inhale audio signal may be played during a window synchronized with a phase window of the heart rate variation signal when a user should inhale, and an exhale audio signal may be played during a window synchronized with a phase window of the heart rate variation signal when a user should exhale.

Delivering of feedback may be synchronized to the declining portion of the heart rate variation periodic signal, which functions to synchronize the user's focus with the breath. The feedback system can be activated or changed to a first state (e.g., activating haptic, audio, or visual feedback) at substantially the local maximum of the heart rate variability signal (e.g., relative to maximum heart rate variation) and then sustained until the local minimum of the heart rate variability signal (e.g., deactivated relative to minimum heart rate variation). This window of the heart rate signal can correlate to the outward/exhaling breath of a user. A user can be reminded to breathe outward during this window. The activation of the feedback system can additionally offset the activation window to the biosignal. This can be used to promote longer or shorter breaths. Additionally, the phase alignment between feedback activation states and heart rate variation may be adjusted in any suitable way. For example, haptic feedback can be synchronized to the rising portion of heart rate variation by activating relative to a local minimum of heart rate variation (e.g., at the local minimum) and deactivating relative to the local maximum of heart rate variation (e.g., at the local maximum).

Synchronizing the feedback can additionally include augmenting the timing of the feedback in coordination with the local maximum and minimum of the signal. In one implementation, this may be done to promote a breathing pattern objective. The method can include determining a breathing pattern objective, which may be based on the current physiological conditions, physiological history, or any suitable property. Augmenting the timing may include offsetting the initiation before or after the local maximum heart rate variation. Similarly, timing may include offsetting the ending of feedback (e.g., haptic, audio, and/or visual) to before or after the local minimum. Augmenting the activation window (e.g., the period of haptic feedback between activation and ending) can encourage different breathing patterns. These adjustments can be made to reinforce longer breaths, shorter breaths, speeding up breathing rate, slowing down breathing rate, breathing in a particular pattern, or making any suitable change to breathing. For example, if a user is taking short breaths, then the method may augment the timing of synchronized haptic feedback so that the user is reminded to take longer breaths.

The parameters of this guided breathing and augmentation of the feedback can be prescribed based on a generated output from a feedback treatment plan. Appropriate times for delivering guided breathing, the frequency of guided breathing, the duration of guided breathing sessions, and the feedback properties may be enhanced through reinforcement learning thereby customizing the biofeedback to a user.

As another example of a type of biofeedback, delivering biofeedback (S132) can include providing heart rate biofeedback. In this variation, calculation and use of HRV may optionally not be included. In one variation, feedback can be triggered in synchronization with the user's heart rate. For example, vibrations, audio cues, and/or visual cues may be activated/deactivated in synchronization with the heart beats of the user.

Alternative forms of treatment, such as aural feedback and visual feedback, may be implemented as desired. In one variation, visual or audio cues can also be delivered. Timing and content of such audio and/or visual cues can be determined. For example, S120 used in determining a feedback treatment plan may be applied to selecting when and the type of visual notification to be used in alerting a user. The content of the communication can additionally be specified. For example, the visual cue may include instructions for a particular exercise and the properties of that exercise (e.g., type of exercise, number of repetitions, duration, number of sets, and the like) may be specified. S120 may additionally address selecting from different forms of feedback such as determining when to use haptic feedback, audio/visual cues, pharmaceutical usage changes, and the like.

Delivering biofeedback may include delivering a recommended treatment which could include a warning stimulus. The warning stimulus is implemented to provide the user information about the health state of the user. In one preferred variation, the warning stimulus may include continuous visual health state updates. For example, providing a recommended treatment from the feedback treatment plan as feedback, may include sending continuous health state data to a personal electronic device (e.g., smart watch, mobile phone, laptop). Alternative types of warning stimulus may include the haptic feedback giving a strong vibration in extreme situations (e.g., during a heart attack, or when a user is active but feeling sleepy).

As discussed above, another variation can include directing administration of a treatment. Administration of a treatment may include directing administration of one or more pharmaceutical, the practice of a therapy (e.g., exercises), and/or any suitable type of treatment. The method can preferably include recording treatment parameters. Through reinforcement learning recommendations can be customized and improved for an individual.

Block S134, which includes delivering behavioral intervention feedback based on the feedback treatment plan, functions to execute informational feedback to the user. Behavioral intervention feedback may be used in combination with biofeedback. In some variations or instances, behavioral intervention feedback may be determined to be a suitable intervention for a particular moment (based on the treatment plan) while delivering biofeedback may be determined to be a suitable intervention for a different moment (based on the treatment plan). Alternatively, in some variations or instances behavioral intervention feedback could be delivered in combination with biofeedback where they are triggered at the same or overlapping times.

Delivering the behavioral intervention feedback may be delivered by displaying a message on a computing device, sending a digital message to the user (e.g., an email, chat message, push notification, etc.), triggering a digital interaction (e.g., a quiz, game, or other type of digital interaction).

In one exemplary variation, behavioral intervention feedback may be used in delivering cognitive behavioral therapy (CBT) intervention feedback. The method can enable the execution of CBT to be determined based on an algorithmically derived treatment plan which is at least partially based on biometric inputs. In this way, CBT treatments may be automatically administered based on biometric inputs like heart rate and/or HRV.

In one example, delivering behavioral intervention feedback can include triggering a digital event that includes cognitive behavioral therapy information. The digital event could be a digital communication event. For example, a message may be transmitted, or an app may be updated to display information relating to a cognitive behavioral therapy intervention. This may be used to provide a quiz in which a user can answer questions on their current moment (e.g., what are the user's current surroundings, sensations, etc.).

Block S140, which includes generating and/or outputting a pharmaceutical usage report, functions to deliver output feedback related to pharmaceutical usage. The report may be used to provide a predicted recommendation on pharmaceutical usage, provide basic information (e.g., predicted timeline of medicine intake), and the like.

In some variations of a method involving administration of treatment, the method can include generating and/or outputting a pharmaceutical usage recommendation S140, which functions to direct pharmaceutical usage. In particular, pharmaceuticals of interest may be those used for mental illnesses or disabilities or those which may otherwise alter mode. Such pharmaceuticals may have an impact on the HRV signal and/or other biometric signals. The pharmaceutical usage may indicate one or more pharmaceutical type recommendations, dosage amounts, timing/frequency of use, and/or the start or stop of usage. In one example, the method may recommend a new pharmaceutical that may be predicted to have better results based on monitoring of the biometric data and/or response to the biofeedback. In another example, the method may recommend changing the number of pills or dosage for a medicine or alternatively the timing of when medicine is taken (e.g., once a day, twice day, etc.). In another example, the method may recommend stopping or starting pharmaceutical usage.

Additionally or alternatively, the method may include reporting on pharmaceutical usage. This variation may not involve explicit instructions related to usage of a pharmaceutical usage but could be used to monitor pharmaceutical usage. This may involve tracking effectiveness of a pharmaceutical. In some cases, this may be in comparison to effectiveness of biofeedback sessions. In some cases, heart rate variability is used as a metric for comparison. Similarly, reporting on pharmaceutical usage can include tracking changes in effectiveness to detect if the effect of a pharmaceutical (e.g., as indicated through HRV signals).

In some preferred variations, the method is preferably performed repeatedly such that the method can in fact detect a biometric response, update a feedback treatment plan, and then deliver feedback based on such updates. Accordingly, the method may include delivering a first biofeedback session based on a first feedback treatment plan (S132); determining an updated feedback treatment plan based on processing of biometric inputs that includes biometric inputs collected during and/or after delivering the feedback S150 and delivering a second biofeedback session based on the updated feedback treatment plan S152.

Blocks S150 and S152, which include determining an updated feedback treatment plan based on processing of biometric inputs that includes biometric inputs collected during and/or after delivering the feedback and delivering a second biofeedback session based on the updated feedback treatment plan, functions to use collection of biometric signals after delivering biofeedback and using that to improve subsequent biofeedback. Learning algorithms may be implemented to improve the machine learning models used in determining a feedback treatment plan such that the recommended treatment optimizes the improvement of the health state of the user. The model learning may be based around one user, but preferably improving the treatment model employs learning over the plurality of users, as described for the health model.

3. System

Figure 11:
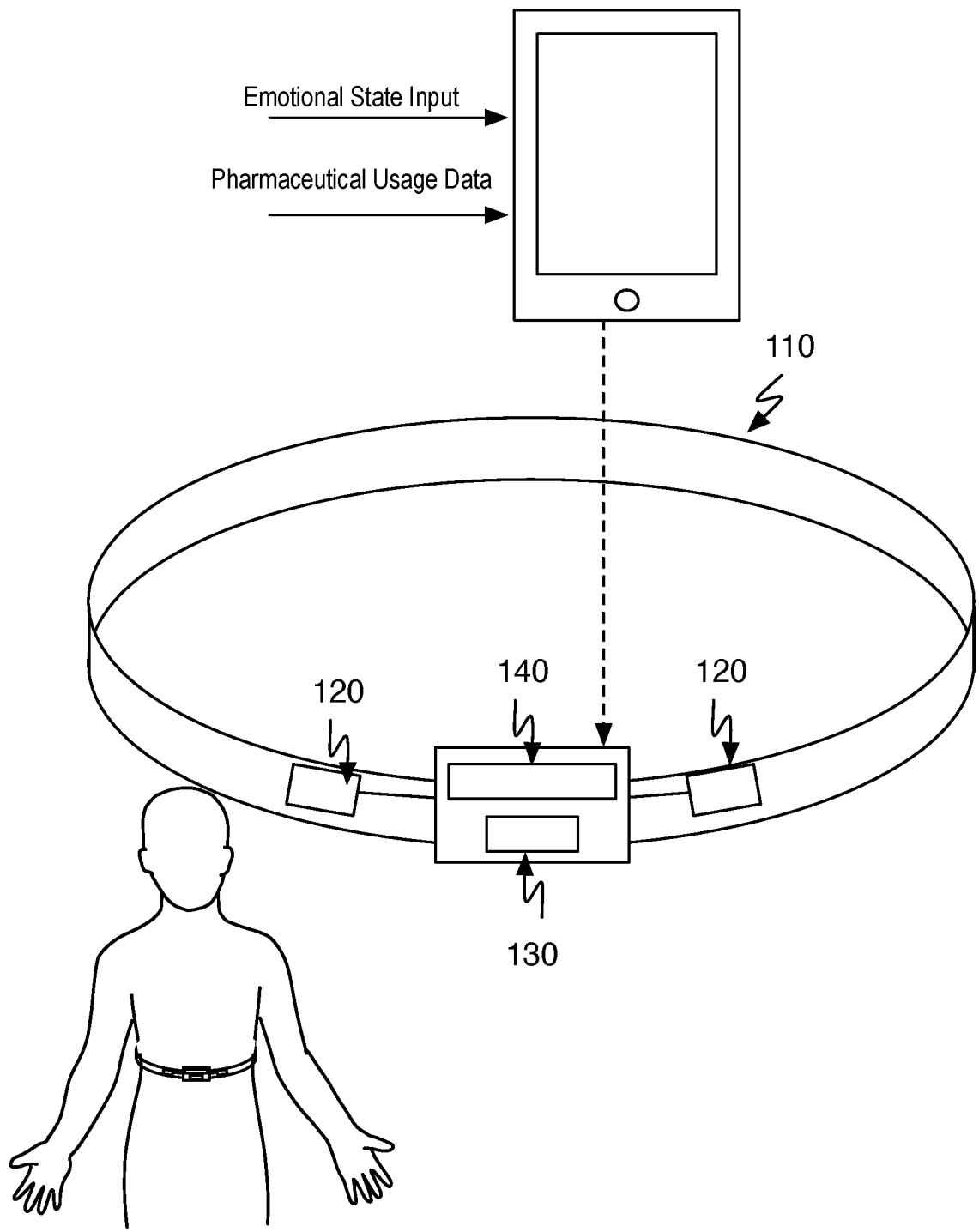
FIG. 11 is a schematic representation of a system.

As shown in FIG. 11, a therapeutic system that provides dynamic biofeedback from a wearable device may include an attachment structure 110, a sensor system 120, a feedback system 130, and a computing system 140. The system functions to provide AI haptic feedback as described in the method above. The system may be an unobtrusive wearable device that monitors user physiological data, and the user physiological data can be incorporated into an AI model for the user health and an associated AI model for interactive user feedback. The system is preferably used in implementing the system described above, but any alternative system may also be used in implementing the system above.

As discussed above, the form factor and implementation of the system can vary, and some variations may make use of one or more multiple computing devices that work in coordination. The system is preferably used in implementing a method such as described herein, but may alternatively.

The attachment structure 110 of a preferred embodiment functions to house a set of system components and to physically couple a device to a user when worn. The attachment structure no houses at least a subset of components of the system. The attachment structure 110 can be made of any suitable material and may include a variety of structural geometries. The attachment structure 110 is preferably a wearable or attachable element that may be configured for coupling to the body at the torso/chest as shown in FIG. 11, the wrist, the arm, the neck, the ear, the head, or at any suitable location. The attachment structure can be one of a chest band, a wristband, undergarment (e.g., a bra), head mounted device, ring, necklace, patch, glasses, or any suitable wearable item. The attachment structure 110 can include an adhesive attachment mechanism to stick to a user's body (e.g., an adhesive patch). The attachment structure no may alternatively include a clasp so as to be attached or released from the body. For example, a strap may include a variable length clasp so that it can be placed around a user's torso or removed. The attachment structure 110 may alternatively or additionally include an attachment mechanism such as a clip, button, hoop and loop fastener, magnet, or any suitable attachment mechanism. The attachment mechanism can function to enable the device to be attached to another element such as a third-party band or to an undergarment. The attachment structure 110 can use any suitable approach to make a wearable device.

When worn, the attachment structure no preferably physically couples the sensor system 120 and optionally the feedback system 130 to a portion of a user's body. The physical coupling may be promoted in regions of the sensor system 120 and the feedback system 130—physical contact with the body may be preferred for operation of some variations of the sensor system.

The sensor system 120 of a preferred embodiment functions to sense at least one physiological property of the user. The sensor system 120 can preferably sense the heart activity of a user. The sensor system 120 can include an electrocardiogram (ECG) sensor, an electroencephalogram (EEG) sensor, an electromyography (EMG) sensor, a galvanic skin response (GSR) sensor, a photoplethysmography (PPG) sensor, an infrared spectroscopy (NIRS) sensor, a photoplethysmography (PPG) sensor, and/or a breath sensor. As discussed above, one implementation uses a dry skin electrode system with at least two electrodes that can detect heart activity when in contact with the body 122. The sensed heart activity is preferably used to generate a heart rate signal, which can be used in monitoring heart rate variability (HRV). The heart rate signal can additionally be correlated to breathing rate, but the breathing rate may alternatively be measured or deduced through other biosensing approaches. In one variation, the sensor system 120 can include an ECG sensor. The magnitude of the Rspike can be correlated to the breathing rate of a user. The Rspike preferably is greater when during an exhaling breath compared to an inhaling breath in part because the sensor positioned on the chest may be physically closer to the heart. Breath may alternatively be sensed directly using a breath sensor which may include an optical system, motion sensor (e.g., an inertial measuring unit IMU) or any suitable type of breath sensor. The sensor system 120 is preferably positioned within the attachment structure 110 to promote a preferred alignment and orientation on the body.

In addition to the sensing system, the system may include additional data input channel interfaces through which additional or alternative biometric or user related data can be collected. For example, emotional state data and/or pharmaceutical usage data may be collected through user input into a connected application.

In one variation, the sensor system 120 can additionally include an inertial measurement unit (IMU), which may include one or more accelerometers, gyroscopes, magnetometers, and/or other inertial sensing components. The IMU may be used to acquire activity information for a user. The activity information may be used to detect when the user is participating in strenuous activity, in which case increased heart rate can be attributed to physical activity and not a change in the mental state of the user.

The feedback system 130 of a preferred embodiment functions to provide detectable and unobtrusive feedback to the user. The feedback system 130 is preferably activated by the computing system 140 based on at least the one sensor of the sensor system no. As described above, the feedback system 130 can be a haptic feedback system that provides tactile feedback, but may additionally or alternatively provide visual, and/or auditory feedback. In some variations, the feedback is in the form of treatment recommendation, which directs application of a treatment. Treatment recommendation feedback can be a communication or directive specifying treatment parameters such as treatment timing, duration, dosage, type, and the like.

The haptic feedback system may be a tactile feedback system that delivers contact touch-based stimulation to at least one point on the body. Alternative haptic feedback systems may use electrical stimulation or other forms of haptic feedback. The tactile feedback elements can apply their stimulation through movement of the attachment structure no or other elements. The tactile feedback elements may alternatively apply stimulation directly to the body surface of the user. Direct tactile contact can use less energy and be less obtrusive than applying tactile feedback through motion of the attachment structure no. The haptic feedback system can include actuators such as vibrational elements, protruding elements, tapping elements, and/or any suitable type of tactile feedback element. The haptic feedback system can additionally or alternatively include haptic feedback elements such as a heating element. In one implementation, the haptic feedback system includes a single haptic feedback element. For example, the haptic feedback system can include one vibrational motor. The haptic feedback system 130 more preferably includes a set of haptic feedback elements (i.e., haptic feedback nodes). Herein, vibrational nodes are described as a preferred implementation, but any suitable alternative or additional feedback element may be used.

The haptic feedback system preferably includes a set of haptic feedback nodes, more specifically a set of vibrational nodes. The set of vibrational nodes can be an array of vibrational elements. The array of vibrational nodes preferably has a particular arrangement and organization. The array of vibrational nodes can be a one-dimensional array. The one-dimensional array of vibrational nodes is substantially arranged in a linear or sequential arrangement. Activation of the vibrational row nodes may result in a user experiencing directional movement back and forth across the row of vibrational nodes. The array of vibrational nodes can be arranged in a two-dimensional (2D) array. The 2D array may be distributed over a prolonged length of the attachment structure no. The 2D array may alternatively be centralized. For example, a circular array of vibrational nodes can enable radial patterns, movement patterns along different axis, and other suitable patterns. There may additionally be multiple discrete 2D arrays of vibrational nodes.

The feedback system 130 may additionally include feedback through an external device. In some variations, the feedback system 130 may connect to a smart watch (e.g., smart watch), a smartphone, or other type of portable "smart" device. The feedback system may provide visual, auditory, or vibrational feedback through the smart device. In one example, the feedback system 130 provides dynamic health updates through the smart device. In one implementation, the feedback system 130 may provide explicit instructions for the user through the smart device.

The computing system 140 of a preferred embodiment functions to manage operation of the system. The computing system 140 is preferably housed within the attachment structure no. The computing system 140 can include a processor (e.g., a microprocessor), storage, communication module(s) (e.g., Bluetooth, Wi-Fi, cellular data module, etc.), component drivers (e.g., biosensor driver circuitry and haptic feedback driver circuitry), power system, and/or any suitable components to facilitate operation. The power system could be any suitable type of battery or source of power such as a rechargeable and/or removable battery. The power source element could additionally include a recharging element for recharging the power source. The communication module can be a wireless transmitter that may send and/or receive data with a plurality of external devices, i.e., smartphones, computers, or other devices. In one variation auditory, visual, or tactile feedback for the user is displayed by an external device, like a mobile phone, tablet or desktop computer. The feedback can be communicated with the wireless transmitter.

The computing system 140 may additionally maintain and operate the machine learning algorithms and models of the system as described previously. Through the computer system 140, the machine learning algorithms interface with both the sensor system and the feedback system; enabling the machine algorithms to receive input from the sensor system and to provide directed output through the feedback system. Storage of the machine learning algorithm may be directly on the wearable device but will be preferably implemented on a subcomponent of the computing system external to the wearable device.

In one variation, the computing system 140 includes a first device computing system integrated in the attachment structure 110 and a second user interface application operable on a second device and in communication with the first device. The first device computing system can facilitate sensing and haptic feedback, which the user interface application portion provides operability on a personal computing device. The user interface application can additionally function to provide additional user interface options. The user interface application is preferably operable on a personal computing device such as a smart phone, smart watch, a tablet, a wearable computer, a desktop computer, and/or any suitable computing device. The user interface application can provide access to graphical user interface, auditory cues, device haptic feedback, and other forms of user interfaces. The device worn by the user can be in communication with the device of the user interface application. The user interface application can be used to show historical data, receive user input, and perform any suitable task.

In another variation, comprising of multiple system devices for the use of multiple users, each first device computing system is integrated in the attachment structure, and a second system computing device is cloud-based device that can communicate with the first device computing system. The cloud based second device computing system may be enabled for two-way communication with each first device. Additionally, the second device may maintain and operate the system machine learning algorithms enabling machine learning concurrent learning from multiple devices simultaneously. Instead of cloud based, the second system computing device may be on any type of platform that can simultaneously communicate with a plurality of wearable devices (e.g., central server).

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

In one variation, a system comprising of one or more computer-readable mediums (e.g., a non-transitory computer-readable medium) storing instructions that, when executed by the one or more computer processors, cause a computing platform to perform operations comprising those of the system or method described herein such as: collecting a set of biometric inputs, determining a feedback treatment plan based on processing of the biometric inputs, and delivering feedback based on the feedback treatment plan.

Figure 12:
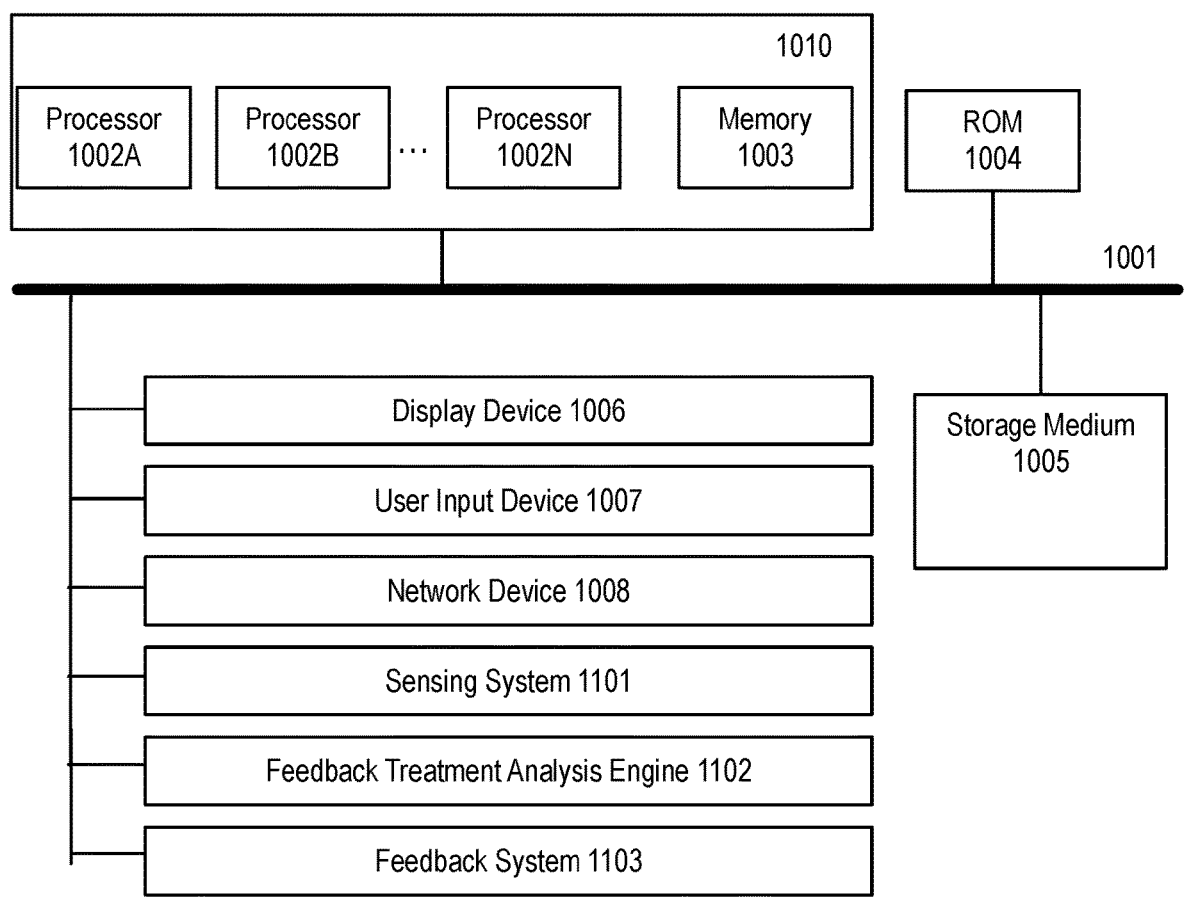
FIG. 12 is an exemplary system architecture that may be used in implementing the system and/or method.

FIG. 12 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random-access memory (RAM)) 1003, a read only memory (ROM) 1004, a processor-readable storage medium 1005, a display device 1006, a user input device 1007, and a network device 1008. As shown, the computer infrastructure may be used in connecting a sensing system 1101, feedback treatment analysis engine 1102, feedback system 1103, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid-state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

I claim:

1. A method for a wearable device comprising:
   at a biosensor on the wearable device, collecting a set of biometric inputs of a user comprising at least heart activity data;
   generating a heart rate variability signal from the heart activity data;
   analyzing the heart rate variability signal and determining a user specific health baseline from the biometric input data by comparing the user biometric input data to general population data;
   determining a feedback treatment plan based on the user specific health baseline which comprises outputting a set of parameters of a feedback treatment plan comprising at least a heart rate variability activation threshold for when biofeedback session is initiated and a heart rate variability target threshold used to determine when to end a biofeedback session;
   at a feedback system of the wearable device, continuously monitoring the heart rate variability signal throughout the day and automatically delivering real-time feedback based on the feedback treatment plan during multiple biofeedback sessions per day responsive to real-time biometric conditions when the heart rate variability signal is below the heart rate variability activation threshold and ending each biofeedback session conditional on the heart rate variability target threshold, wherein the heart rate variability activation threshold and heart rate variability target threshold parameters are dynamically adjusted based on the user specific health baseline and a real-time analysis of biofeedback session effectiveness as measured by heart rate variability changes during each biofeedback session, thereby customizing providing titration of biofeedback for enhanced application of biofeedback the user.

2. The method of claim 1, wherein delivering the feedback comprises delivering biofeedback in a form of feedback selected from the set of haptic, visual, and audio feedback.

3. The method of claim 2, wherein determining the feedback treatment plan further comprises processing the biometric inputs as model inputs into a machine learning model, the model contributing to the outputting of at least one parameter of the feedback treatment plan.

4. The method of claim 3, wherein the set of parameters of the feedback treatment plan is a timing parameter for duration of a biofeedback session.

5. The method of claim 1, wherein delivering feedback comprises activating feedback in synchronization with the heart rate variation signal.

6. The method of claim 5, wherein determining a feedback treatment plan based on processing of the biometric inputs can include determining at least one feedback synchronization parameter.

7. The method of claim 1, wherein delivering the feedback comprises triggering a digital communication event that includes cognitive behavioral therapy information.

8. The method of claim 1, wherein collecting the set of biometric inputs can further include collecting pharmaceutical usage data; wherein determining a feedback treatment plan based on processing of the biometric inputs is additionally based on the pharmaceutical usage data.

9. The method of claim 8, further comprising outputting a pharmaceutical usage recommendation.

10. The method of claim 1, wherein the heart rate variability activation threshold and heart rate variability target threshold are optionally further modified through a user interface input.

11. A non-transitory computer-readable medium of a wearable device storing instructions that, when executed by one or more computer processors of a computing platform, cause the computing platform to perform the operations:
    collecting a set of biometric inputs comprising at least heart activity data;
    generating a heart rate variability signal from the heart activity data;
    analyzing the heart rate variability signal and determining a user specific health baseline from the biometric input data by comparing the user biometric input data to general population data;
    determining a feedback treatment plan based on the user specific health baseline which comprises outputting a set of parameters of a feedback treatment plan comprising at least a heart rate variability activation threshold for when biofeedback session is initiated and a heart rate variability target threshold used to determine when to end a biofeedback session;
    continuously monitoring the heart rate variability signal throughout the day and automatically delivering real-time feedback at a feedback system of the wearable device based on the feedback treatment plan during multiple biofeedback sessions per day responsive to real-time biometric conditions when the heart rate variability signal is below the heart rate variability activation threshold and ending each biofeedback session conditional on the heart rate variability target threshold, wherein the heart rate variability activation threshold and heart rate variability target threshold parameters are dynamically adjusted based on the user specific health baseline and a real-time analysis of biofeedback session effectiveness as measured by heart rate variability changes during each biofeedback session, thereby providing titration of biofeedback for enhanced application of biofeedback the user.

12. The non-transitory computer-readable medium of claim 11, wherein delivering the feedback comprises delivering biofeedback in a form of feedback selected from the set of haptic, visual, and audio feedback.

13. The non-transitory computer-readable medium of claim 12, wherein delivering feedback comprises activating feedback in synchronization with the heart rate variability signal.

14. The non-transitory computer-readable medium of claim 12, wherein collecting the set of biometric inputs can further include collecting pharmaceutical usage data; wherein determining a feedback treatment plan based on processing of the biometric inputs is additionally based on the pharmaceutical usage data; and further comprising outputting a pharmaceutical usage recommendation.

15. A system comprising of:
    a wearable device comprising at least one biosensor and a feedback system;
    one or more computer-readable mediums storing instructions that, when executed by the one or more computer processors, cause a computing platform to perform operations comprising:
    collecting a set of biometric inputs from the at least one biosensor comprising at least heart activity data;
    generating a heart rate variability signal from the heart activity data;

analyzing the heart rate variability signal and determining a user specific health baseline from the biometric input data by comparing the user biometric input data to general population data;

determining a feedback treatment plan based on the user specific health baseline outputting a set of parameters of a feedback treatment plan comprising at least a heart rate variability activation threshold for when biofeedback session is initiated and a heart rate variability target threshold used to determine when to end a biofeedback session;

continuously monitoring the heart rate variability signal throughout the day and automatically delivering real-time feedback to the feedback system based on the feedback treatment plan during multiple biofeedback sessions per day responsive to real-time biometric conditions when the heart rate variability signal is below the heart rate variability activation threshold and ending each biofeedback session conditional on the heart rate variability target threshold, wherein the heart rate variability activation threshold and heart rate variability target threshold parameters are dynamically adjusted based on the user specific health baseline and a real-time analysis of biofeedback session effectiveness as measured by heart rate variability changes during each biofeedback session, thereby providing titration of biofeedback for enhanced application of biofeedback the user.

16. The system of claim 15, wherein delivering feedback comprises activating biofeedback in synchronization with the heart rate variation signal.

17. The system of claim 15, wherein collecting the set of biometric inputs can further include collecting pharmaceutical usage data; wherein determining a feedback treatment plan based on processing of the biometric inputs is additionally based on the pharmaceutical usage data; and further comprising outputting a pharmaceutical usage recommendation.

18. The system of claim 15, wherein the heart rate variability activation threshold and heart rate variability target threshold are optionally further modified through a user interface input.

* * * * *